(12) United States Patent
Gawlik et al.

(10) Patent No.: US 12,539,612 B2
(45) Date of Patent: *Feb. 3, 2026

(54) METHOD AND APPARATUS FOR HEALTH ASSESSMENT OF A TRANSPORT APPARATUS

(71) Applicant: BROOKS AUTOMATION US, LLC, Chelmsford, MA (US)

(72) Inventors: Aaron Gawlik, Burlington, MA (US); Jairo T. Moura, Marlborough, MA (US)

(73) Assignee: BROOKS AUTOMATION US, LLC, Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,685

(22) Filed: Oct. 17, 2023

(65) Prior Publication Data

US 2024/0058966 A1 Feb. 22, 2024

Related U.S. Application Data

(63) Continuation of application No. 17/664,752, filed on May 24, 2022, now Pat. No. 11,787,058, which is a (Continued)

(51) Int. Cl.
*B25J 9/16* (2006.01)
*G05B 23/02* (2006.01)
*G07C 3/08* (2006.01)

(52) U.S. Cl.
CPC ........... *B25J 9/1674* (2013.01); *B25J 9/1633* (2013.01); *B25J 9/1664* (2013.01); (Continued)

(58) Field of Classification Search
CPC .............................. B25J 9/1674; B25J 9/1633
See application file for complete search history.

(56) References Cited

U.S. PATENT DOCUMENTS 6,411,908 B1 6/2002 Talbott
7,308,385 B2 12/2007 Wegerich et al.
(Continued)

FOREIGN PATENT DOCUMENTS

CN 1496932 5/2004
CN 101395577 3/2009
(Continued)

OTHER PUBLICATIONS

Taiwan Invention Patent Application No. 107115457 Filing date: May 7, 2018.

*Primary Examiner* — Ricky Go
(74) *Attorney, Agent, or Firm* — Perman & Green, LLP

(57) ABSTRACT

Method for health assessment of a system including a transport apparatus including registering predetermined operating data embodying at least one dynamic performance variable output by the transport apparatus, determining a base value ($C_{pkBase}$) characterized by a probability density function of each of the dynamic performance variable output, resolving from the transport apparatus in situ process motion commands of the apparatus controller and defining another predetermined motion set of the transport apparatus, registering predetermined operating data embodying the at least one dynamic performance variable output by the transport apparatus and determining with the processor another value ($C_{pkOther}$) characterized by the probability density function of each of the dynamic performance variable output by the transport apparatus, and comparing the other value and the base value ($C_{pkBase}$) for each of the dynamic performance variable output by the transport apparatus respectively corresponding to the predetermined motion base set and the other predetermined motion set.

22 Claims, 18 Drawing Sheets

Related U.S. Application Data continuation of application No. 17/103,243, filed on Nov. 24, 2020, now Pat. No. 11,338,437, which is a continuation of application No. 15/971,827, filed on May 4, 2018, now Pat. No. 10,843,341.

(60) Provisional application No. 62/502,292, filed on May 5, 2017.

(52) U.S. Cl.
CPC ..... *G05B 23/0232* (2013.01); *G05B 23/0235* (2013.01); *G05B 23/0283* (2013.01); *G07C 3/08* (2013.01)

(56) References Cited

U.S. PATENT DOCUMENTS

| | | |
|---|---|---|
| 7,567,878 B2 | 7/2009 | Yuan et al. |
| 8,112,165 B2 | 2/2012 | Meyer et al. |
| 8,200,369 B2 | 6/2012 | Cheng et al. |
| 8,352,216 B2 | 1/2013 | Subbu et al. |
| 8,494,817 B1 | 7/2013 | Rao |
| 2004/0246104 A1 | 12/2004 | Baechtiger et al. |
| 2007/0260410 A1* | 11/2007 | Raymond .......... G05B 23/0264 702/81 |
| 2011/0118905 A1 | 5/2011 | Mylaraswamy et al. |
| 2011/0173496 A1 | 7/2011 | Hosek et al. |
| 2014/0222352 A1 | 8/2014 | Sander-Tavallaey et al. |
| 2014/0336791 A1 | 11/2014 | Asenjo et al. |
| 2018/0246766 A1* | 8/2018 | Holmberg ............. G06F 9/5038 |

FOREIGN PATENT DOCUMENTS

| | | |
|---|---|---|
| CN | 101657765 | 2/2010 |
| JP | 2015064348 | 4/2015 |

\* cited by examiner

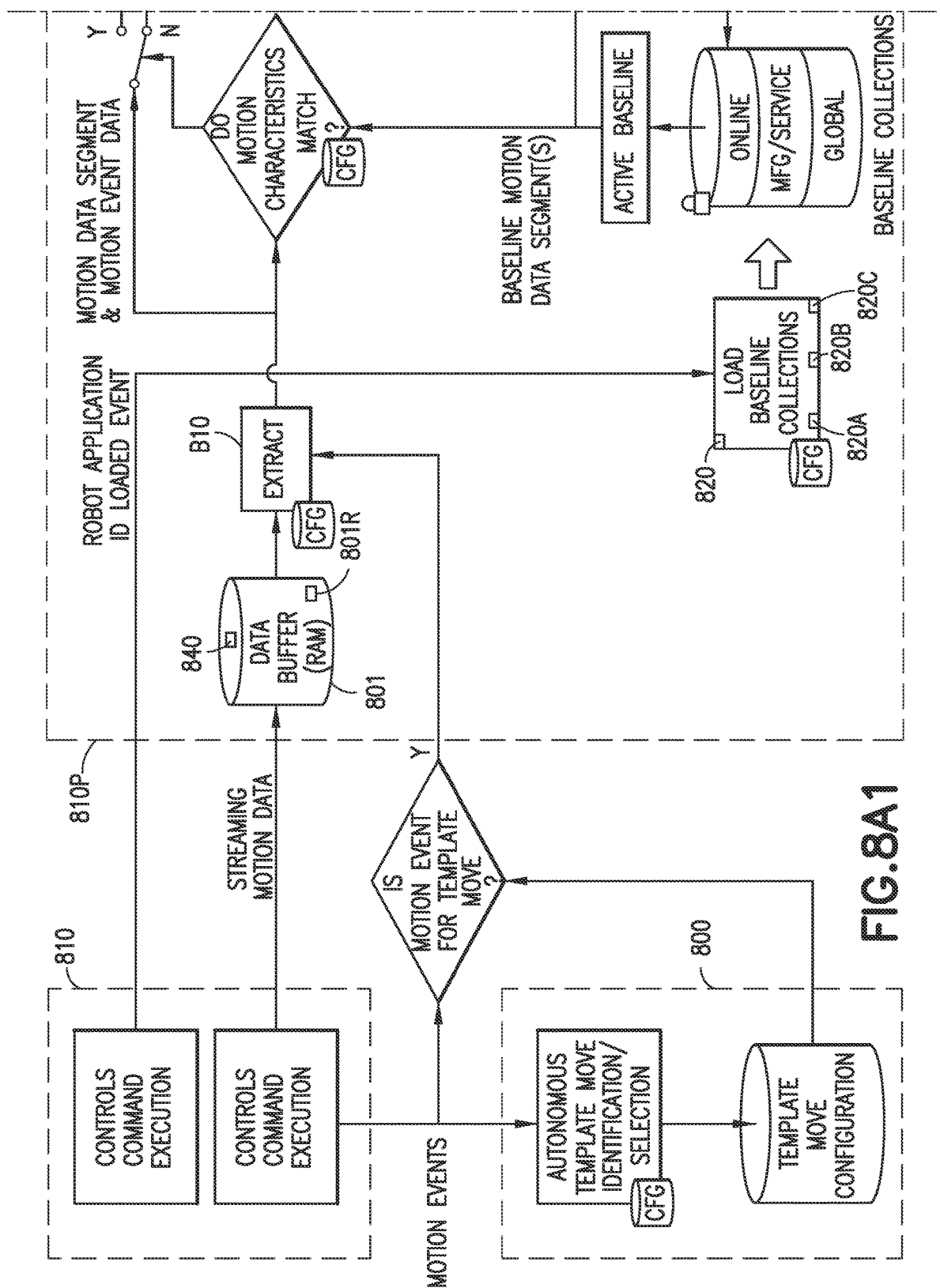
FIG. 8A1

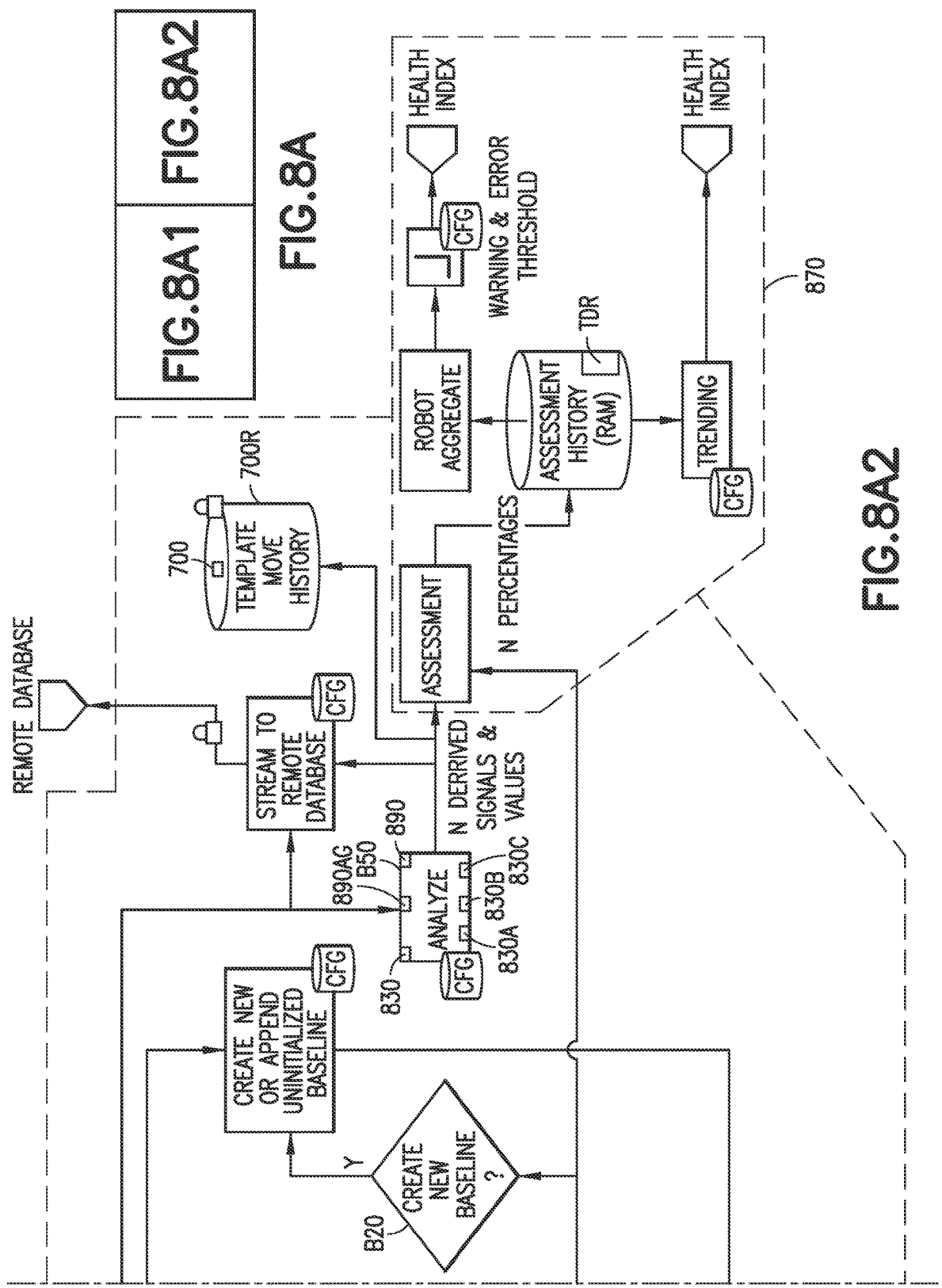

METHOD AND APPARATUS FOR HEALTH ASSESSMENT OF A TRANSPORT APPARATUS

CROSS-REFERENCE TO RELATED APPLICATIONS

This Non-Provisional Patent Application is a continuation of Ser. No. 17/664,752, filed May 24, 2022, which is a continuation of Ser. No. 17/103,243, filed Nov. 24, 2020, (Now U.S. Pat. No. 11,338,437), which is a continuation of Ser. No. 15/971,827, filed May 4, 2018, (Now U.S. Pat. No. 10,843,341), which claims priority to and the benefit of U.S. Provisional Patent Application No. 62/502,292, filed May 5, 2017, the disclosure of which is incorporated herein by reference in its entirety.

BACKGROUND

1. Field

The exemplary embodiments generally relate to automated processing systems, more particularly, to health assessment and predictive diagnostics of the automated processing systems.

2. Brief Description of Related Developments

Material damage and unscheduled downtime due to failures of robotic manipulators and other mechatronic devices used in automated manufacturing tools, such as robotized material-handling platforms for production of semiconductor devices, are common problems which often represent a significant cost burden to the end-user of the manufacturing tools.

A number of health-monitoring and fault-diagnostic (HMFD) methods have been developed for industrial, automotive and aerospace applications. The existing systems typically implement fault detection to indicate that something is wrong in the monitored system, fault isolation to determine the exact location of the fault, i.e., the component which is faulty, and fault identification to determine the magnitude of the fault.

The isolation and identification tasks together are often referred to as fault diagnosis. Many existing systems implement only the fault detection and isolation stages.

Such fault diagnosis schemes, though helpful in the detection of faults, isolation thereof and adaptive recovery, nonetheless leave the device, tool, FAB (e.g. fabrication facility/plant), or other automated equipment to operate in a substantially responsive manner with a limited or substantially non-existent prediction horizon. Predictive methods are known that seek to increase the prediction horizon to fault diagnostic systems, such as mathematic modelling of the automated equipment, in which sensory measurements of the automated equipment variables are compared to analytically computed values of the respective variables (generated, e.g., from Newtonian dynamic models of the automated equipment, or neural network dynamic models), there the mathematic models represent nominal conditions. Such methods suffer from non-conservative factors, such as signal noise and modelling errors, that unpredictably and adversely influence the resulting difference between analytic (nominal) values and those from sensory measurements, and demand further investment by the fault diagnostic system in processing capacity and/or duplicative/redundant sensory systems and data systems to resolve such non-conservative factors.

It would be advantageous to have a fault diagnostic system that provides prediction of faults without the non-conservative factors associated mathematical modelling.

BRIEF DESCRIPTION OF THE DRAWINGS

The foregoing aspects and other features of the disclosed embodiment are explained in the following description, taken in connection with the accompanying drawings, wherein:

FIGS. 8A1 and 8A2 (collectively referred to as FIG. 8A) are a schematic illustration of an exemplary process flow in accordance with aspects of the disclosed embodiment;

DETAILED DESCRIPTION

Figure 1:
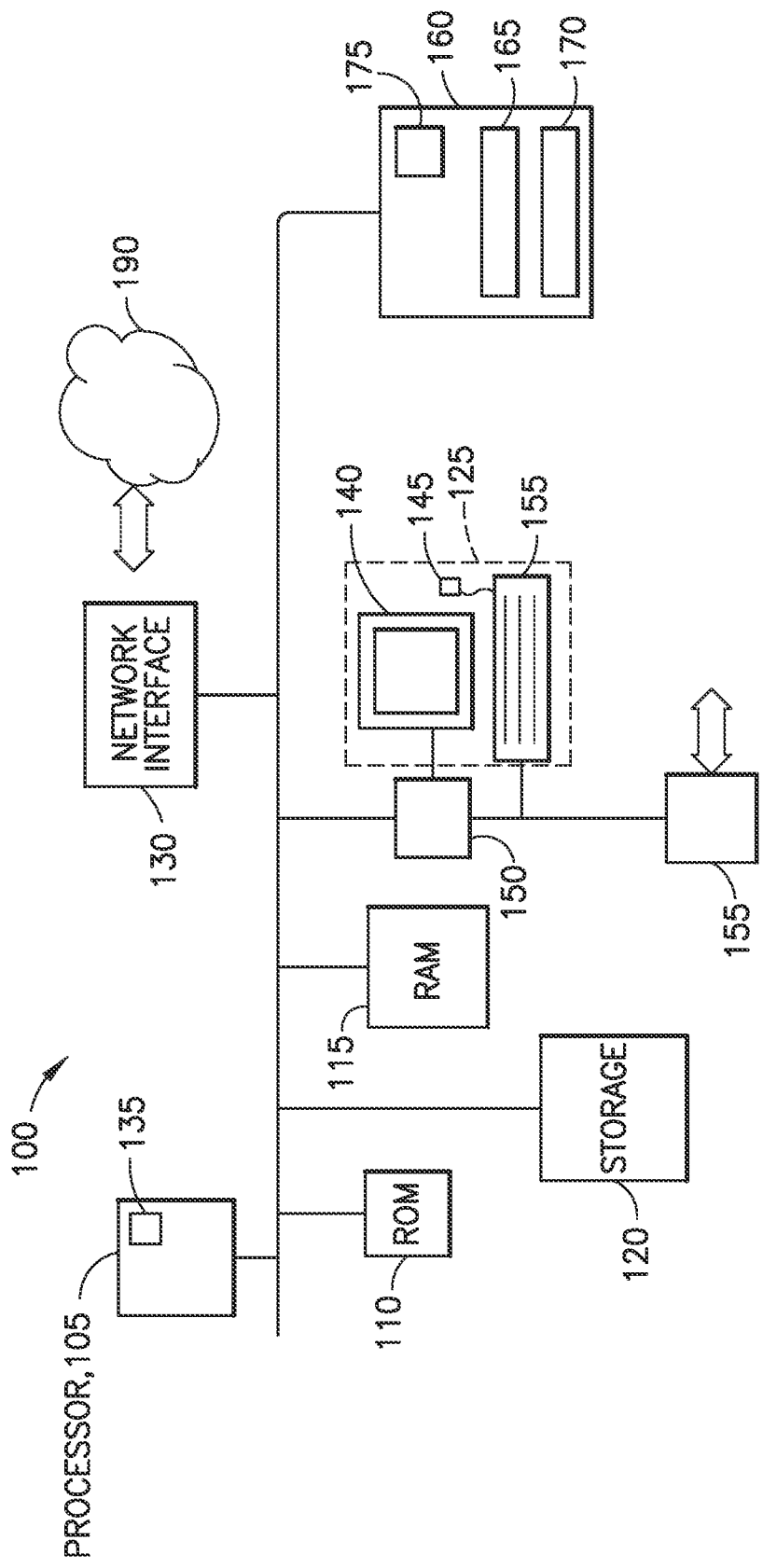
FIG. 1 is a schematic illustration of a controller for an automated apparatus, such as an automated material handling platform, in accordance with aspects of the disclosed embodiment.

Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment described herein provide a method and apparatus for quantifying the health status of and predictive diagnostics for an automated system (such as those descried herein with respect to FIGS. 1-4E) using available variables being monitored by any suitable controller of the automated system (where the controller includes non-transitory computer software code for implementing the aspects of the disclosed embodiment). The metrics of the health status is achieved with the aspects of the disclosed embodiments by a unique statistical data treatment for the variables collected that uniquely correlate to and characterize uniquely for a given apparatus and/or system of several apparatus a health status quantity providing predictive diagnosis of the given apparatus and/or system. The aspects of the disclosed embodiment may allow for the controller of the automated system to determine statistical signatures (uniquely characteristic of a unique device) of the monitored variables (of the unique device) using the concept of "baselines" (which include base values and/or base motions as described herein) and further more comparing future performances against such baselines. As a result, the method and apparatus of the disclosed embodiment may allow for the controller of the automated system to perform predictions based on trending analysis, allowing the controller of the automated system to make recommendations for preventive maintenance based on data that is unique from the automated system being monitored. The aspects of the disclosed embodiment may also allow for identification of an expected limit of operation for variables that are difficult to determine acceptable and practical specifications.

While the aspects of the disclosed embodiment will be described herein with respect to a semiconductor robot (also referred to herein as a robotic manipulator) having three degrees of freedom (theta rotation, R extension and Z lift motion); in other aspects the semiconductor robot may have more or less than three degrees of freedom. In still other aspects, the disclosed embodiment can be applied to other components of a semiconductor processing system having a single degree of freedom of motion (such as robotic transports, load ports, aligners, pumps, fans, valves, etc.). It should also be understood that the aspects of the disclosed embodiment may be used for any automated and/or powered device(s) or system (including, such as, a combination of aforementioned apparatus and/or devices) that is capable of sampling similar or related performance monitoring data that uniquely correlates to and uniquely characterizes each unique apparatus, device and/or system.

The aspects of the disclosed embodiment provide a type of metrics that is normalized based on statistical parameters which allows for a direct comparison of variables of different physical meaning, such as temperature versus peak torque. Such comparison allows for the computation of the impact of such unrelated variables on the overall health status of the automated system being monitored.

FIG. 1 shows an exemplary controller 100 for an automated apparatus incorporating automated apparatus health assessment and predictive diagnostics in accordance with the aspects of the disclosed embodiment. The aspects of the disclosed embodiment may operate in hardware or software. For example, the aspects of the disclosed embodiment may reside in a component controller, a controller that directs the operation of a number of components, a controller that controls a sub-system, or a system controller. The aspects of the disclosed embodiment may also be implemented in dedicated hardware or software.

Figure 3:
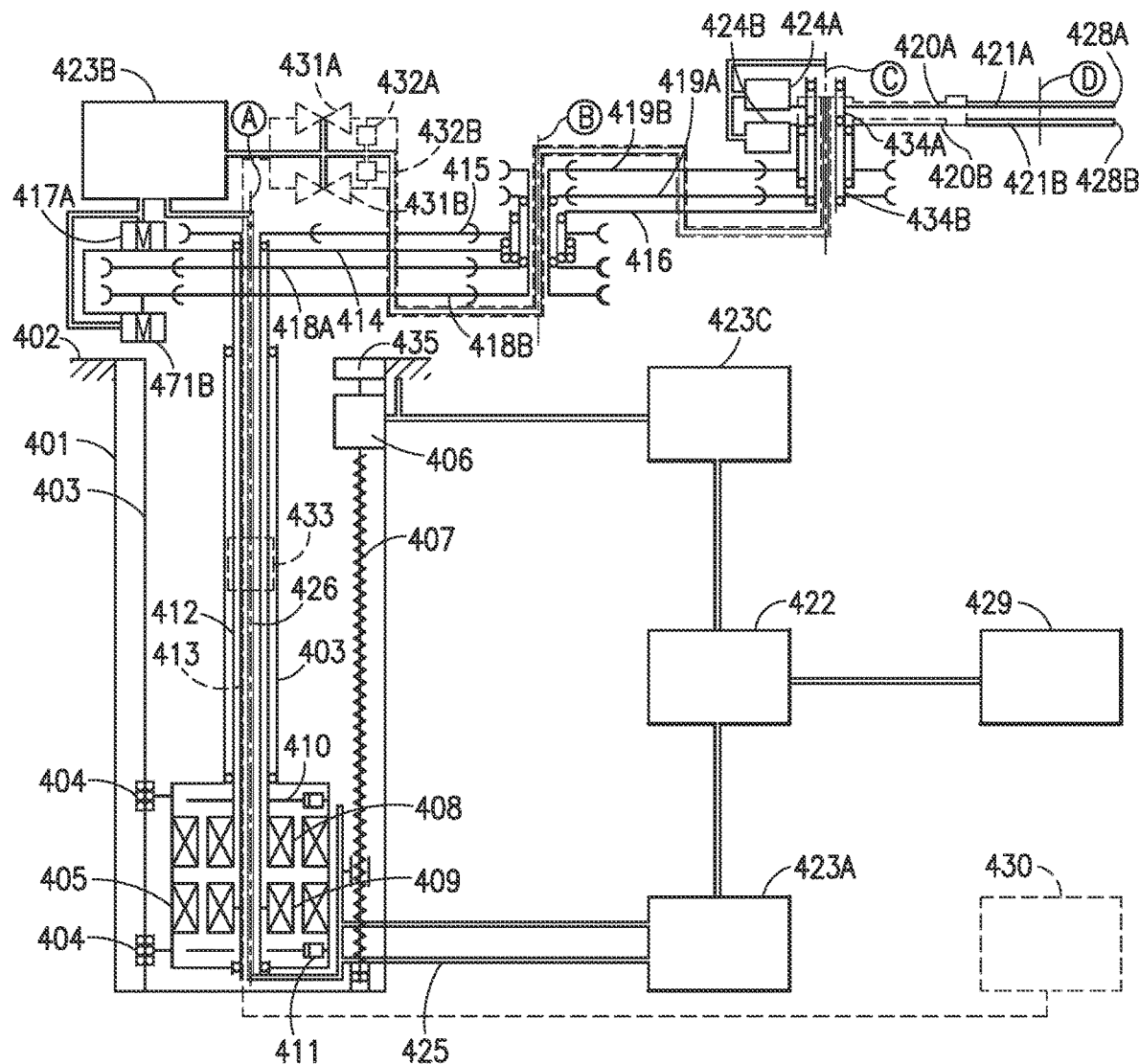
FIG. 3 is a schematic illustration of an apparatus, such as a transport robot, of the automated material handling apparatus in accordance with aspects of the disclosed embodiment.

The controller 100 is any suitable controller of an automated apparatus (such as the automated material handling platform 300 illustrated in FIG. 3) and may generally include a processor 105, read only memory 110, random access memory 115, program storage 120, a user interface 125, and a network interface 130. Processor 105 may include an on board cache 135 and is generally operable to read information and programs from a computer program product, for example, a computer useable medium, such as on board cache 135, read only memory 110, random access memory 115, and program storage 120.

Upon power up, processor 105 may begin operating programs found in read only memory 110 and after initialization, may load instructions from program storage 120 to random access memory 115 and operate under control of those programs. Frequently used instructions may be temporarily stored in on board cache 135. Both read only memory 110 and random access memory 115 may utilize semiconductor technology or any other appropriate materials and techniques. Program storage 120 may include a diskette, a computer hard drive, a compact disk (CD), a digital versatile disk (DVD), an optical disk, a chip, a semiconductor, or any other device capable of storing programs in the form of computer readable code.

On board cache 135, read only memory 110, random access memory 115, and program storage 120, either individually or in any combination may include operating system programs. The operating system programs may be supplemented with an optional real time operating system to improve the quality of data provided by the function controller 100 and to allow the function controller 100 to provide a guaranteed response time.

In particular, on board cache 135, read only memory 110, random access memory 115, and program storage 120, either individually or in any combination may include programs for causing the processor 105 to perform fault diagnostics and fault prediction in accordance with the aspects of the disclosed embodiment as described herein. Network interface 130 may be generally adapted to provide an interface between the controller 100 and other controllers or other systems. Network interface 130 may operate to receive data from one or more additional function controllers and to convey data to the same or other function controllers. Network interface 130 may also provide an interface to a global diagnostic system that may provide remote monitoring and diagnostic services.

Communication network 190 may include the Public Switched Telephone Network (PSTN), the Internet, a wireless network, a wired network, a Local Area Network (LAN), a Wide Area Network (WAN), a virtual private network (VPN) etc., and may further include other types of networks including X.25, TCP/IP, ATM, etc.

The controller 100 may include a user interface 125 with a display 140 and an input device such as a keyboard 155 or mouse 145. The user interface may be operated by a user interface controller 150 under control of processor 105 and may provide a user with a graphical user interface to visualize the results of the health monitoring and fault diagnostics. The user interface may also be used to guide service personnel through troubleshooting routines or repair processes. In addition, the user interface controller may also provide a connection or interface 155 for communicating with other function controllers, an external network, another control system, or a host computer.

Figure 2:
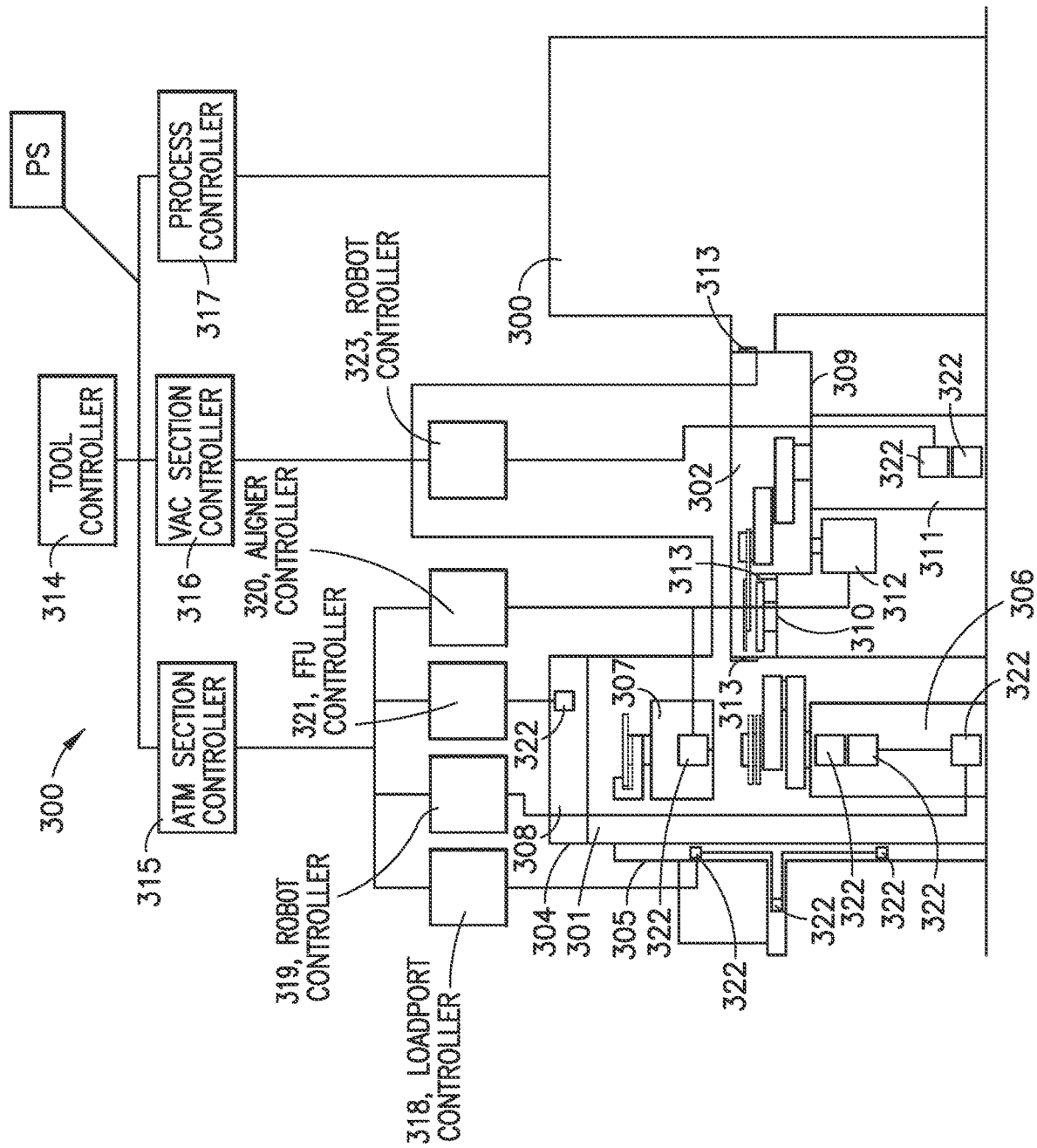
FIG. 2 is a schematic illustration of the automated material handling platform in accordance with aspects of the disclosed embodiment.

An exemplary material-handling platform for production of semiconductor devices in which the aspects of the disclosed embodiment may be implemented is depicted diagrammatically in FIG. 2, with explanatory notes for major components being listed in Table 1. One or more controllers of the material-handling platform of FIG. 2 may include a controller as described herein with respect to FIG. 1.

TABLE 1

Explanatory notes for the automated material handling platform 300 (also referred to as a process tool) of FIG. 2.

| Number | Description |
|---|---|
| 301 | Atmospheric section |
| 302 | Vacuum section |
| 303 | Process module |
| 304 | Enclosure |
| 305 | Loadport |
| 306 | Atmospheric robotic manipulator |
| 307 | Substrate aligner |
| 308 | Fan-filter unit |
| 309 | Vacuum chamber |
| 310 | Load-lock |
| 311 | Vacuum robotic manipulator |
| 312 | Vacuum pump |
| 313 | Slit valve |
| 314 | Tool controller |
| 315 | Atmospheric section controller |
| 316 | Vacuum section controller |
| 317 | Process controller |
| 318 | Loadport controller |
| 319 | Atmospheric robot controller |
| 320 | Aligner controller |
| 321 | Fan-filter unit controller |
| 322 | Motor controller |
| 323 | Vacuum robot controller |

The automated material handling platform 300 has an atmospheric section 301, vacuum section 302 and one or multiple process modules 303.

The atmospheric section 301 may include an enclosure 304, one or multiple loadports 305, one or multiple robotic manipulators 306, one or multiple substrate aligners 307 and a fan-filter unit 308. It may also include one or more ionization units (not shown). The vacuum section may include a vacuum chamber 309, one or multiple load-locks 310, one or multiple robotic manipulators 311, one or multiple vacuum pumps 312 and a plurality of slit valves 313, which are typically located at the interface of the atmospheric section 301 with the load-locks 310, between the load-locks 310 and the vacuum chamber 309, and between the vacuum chamber 309 and the process module 303.

The operation of the platform is coordinated by the tool controller 314, which supervises the atmospheric section controller 315, vacuum section controller 316 and one or multiple process controllers 317. The atmospheric section controller 315 is in charge of one or multiple loadport controllers 318, one or multiple atmospheric robot controllers 319, one or multiple aligner controllers 320 and a fan-filter unit controller 321. Each of the loadport controllers 318, atmospheric robot controllers 319 and aligner controllers 320 is in turn in charge of one or multiple motor controllers 322. The vacuum section controller 316 is in charge of one or multiple vacuum robot controllers 323, controls the vacuum pump 312 and operates the slit valves 313. The role of the process controller 317 depends on the operations performed in the process modules 303.

In some cases, it may be practical to combine two or more layers of control into a single controller. For instance, the atmospheric robot controller 319 and the corresponding motor controllers 322 may be combined in a single centralized robot controller, or the atmospheric section controller 315 can be combined with the atmospheric robot controller 319 to eliminate the need for two separate controller units.

A five-axis direct-drive robotic manipulator 400 may be employed in the automated material handling platform 300 of FIG. 2 where one or more of the atmospheric robotic manipulator 306 and the vacuum robotic manipulator 311 is/are substantially similar to the robotic manipulator 400. A simplified schematic of such a robotic manipulator 400 is provided in FIG. 3. Explanatory notes for major components are listed in Table 2. In one aspect, the aspects of the disclosed embodiment may be implemented within the robot manipulator 400; however, it should be understood that while the aspects of the disclosed embodiment are described with respect to a robotic manipulator, the aspects of the disclosed embodiment can be implemented in any suitable automated portion of the automated material handling platform 300 including but not limited to transport robots, load ports, aligners, pumps, fans, valves, etc. noting that the controller 800 in FIG. 8A is a general representation of the controller for any of the aforementioned automated equipment. It is noted that the robotic manipulator 400 is illustrated as a five-axis direct drive robotic manipulator for exemplary purposes only and in other aspects the robotic manipulator (or other automated portion of the process tool including the aspects of the disclosed embodiment) may have any suitable number of drive axes, with any suitable number of degrees of freedom, and with a direct or indirect drive system.

Table 2: Explanatory notes for robotic manipulator 400 of FIG. 3.

TABLE 2

Explanatory notes for robotic manipulator 400 of FIG. 3.

| Number | Description |
|---|---|
| 401 | Robot frame |
| 402 | Mounting flange |
| 403 | Vertical rail |
| 404 | Linear bearing |
| 405 | Carriage |
| 406 | Vertical drive motor |
| 407 | Ball screw |
| 408 | Motor 1 (driving link 1) |
| 409 | Motor 2 (driving link 2) |
| 410 | Encoder 1 (coupled to motor 1) |
| 411 | Encoder 2 (coupled to motor 2) |
| 412 | Outer shaft |
| 413 | Inner shaft |
| 414 | Link 1 (upper arm) |
| 415 | Belt driving link 2 |
| 416 | Link 2 (forearm) |
| 417A | Motor A (driving end-effector A) |
| 417B | Motor B (driving end-effector B) |
| 418A | First stage of belt drive A |
| 418B | First stage of belt drive B |
| 419A | Second stage of belt drive A |
| 419B | Second stage of belt drive B |
| 420A | End-effector A (upper end-effector) |
| 420B | End-effector B (lower end-effector) |
| 421A, 421B | Payload on end-effectors A and B |

TABLE 2-continued

Explanatory notes for robotic manipulator 400 of FIG. 3.

| Number | Description |
|---|---|
| 422 | Master controller |
| 423A, 423B, 423C | Motor controllers |
| 424A, 424B | Electronic units for end-effectors A and B |
| 425 | Communications network |
| 426 | Slip-ring |
| 428A, 428B | Mapper sensors |
| 429 | Power supply |
| 430 | Vacuum pump |
| 431A, 431B | Valves |
| 432A, 432B | Pressure sensors |
| 433, 434A, 434B | Lip-seals |
| 435 | Brake |

Referring to FIG. 3, the robotic manipulator 400 is built around an open cylindrical frame 401 suspended from a circular mounting flange 402. The frame 401 incorporates a vertical rail 403 with linear bearing 404 to provide guidance to a carriage 405 driven by a brushless DC motor 406 via a ball-screw mechanism 407. The carriage 405 houses a pair of coaxial brushless DC motors 408, 409 equipped with optical encoders 410, 411. The upper motor 408 drives a hollow outer shaft 412 connected to the first link 414 of the robot arm. The lower motor 409 is connected to a coaxial inner shaft 413 which is coupled via a belt drive 415 to the second link 416. The first link 414 houses a brushless DC motor 417A which drives through a two-stage belt arrangement 418A, 419A the upper end-effector 420A. Another DC brushless motor 417B and a two-stage belt drive 418B, 419B are employed to actuate the lower end-effector 420B. Each of the stages 418A, 418B, 419A and 419B are designed with a 1:2 ratio between the input and output pulleys. Substrates 421A and 421B are held attached to end-effectors 420A and 420B, respectively, by the means of vacuum-actuated edge-contact grippers, surface-contact suction grippers or passive grippers.

The first link 414, second link 416, upper end-effector 420A and lower end-effector 420B are also referred to as the upper arm, forearm, end-effector A and end-effector B, respectively, throughout the text. The points A, B and C indicate revolute couplings which are referred to as the shoulder, elbow and wrist joints, respectively. Point D denotes a reference point which indicates the desired location of the center of the substrate on the corresponding end-effector.

The control system of the example robotic manipulator may be a distributed type. It comprises a power supply 429, master controller 422 and motor controllers 423A, 423B and 423C. The master controller 422 is responsible for supervisory tasks and trajectory planning. Each of the motor controllers 423A, 423B and 423C execute the position and current feedback loops for one or two motors. In FIG. 3, the controller 423A controls motors 408 and 409, the controller 423B controls motors 417A and 417B and the controller 423C controls motor 406. In addition to executing the feedback loops, the motor controllers also collect data such as motor current, motor position and motor velocity, and stream the data to the master controller. The motor controllers 423A, 423B and 423C are connected to the master controller through a high-speed communication network 425. Since the joint A is an infinite rotation joint, the communication network 425 is routed through a slip-ring 426. Additional electronic units 424A and 424B may be used to support the edge-contact grippers of the end-effectors 420A and 420B, respectively.

Figure 4A:
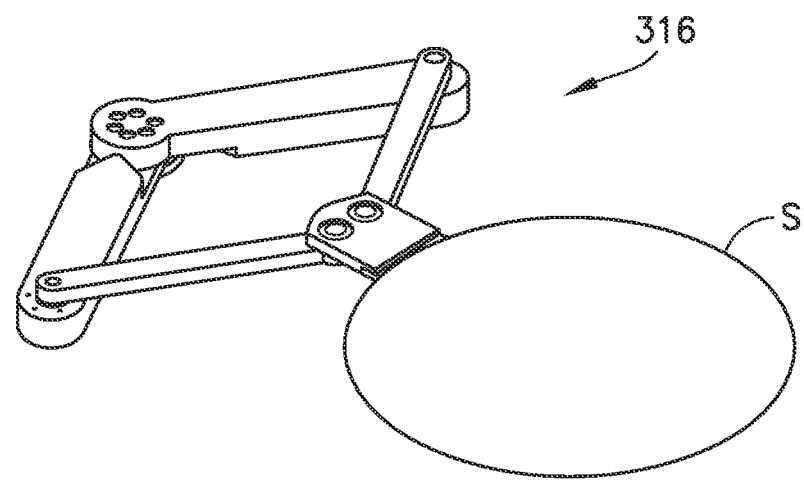
FIGS. 4A-4E are schematic illustrations of different arm configurations for the apparatus of FIG. 3 in accordance with aspects of the disclosed embodiment.
Figure 4B:
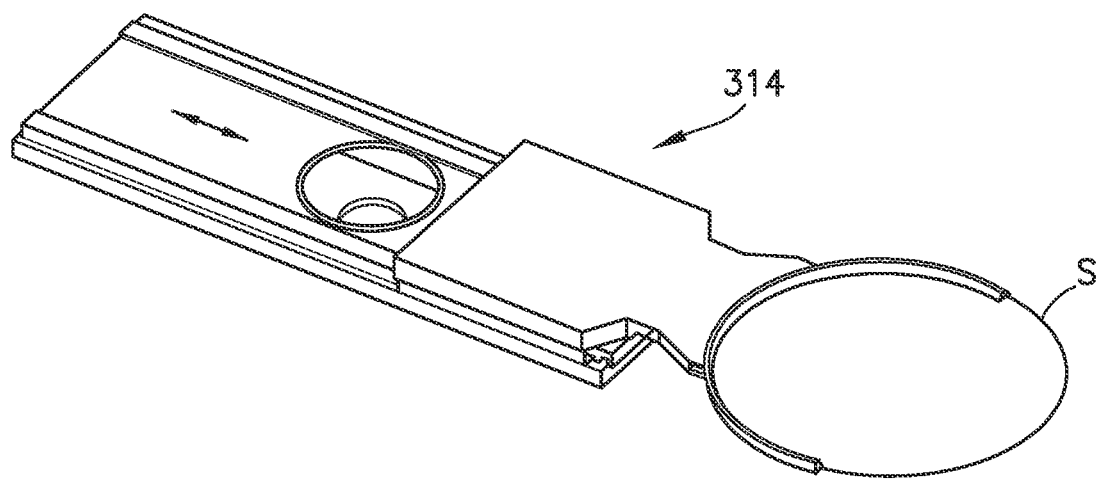
Figure 4C:
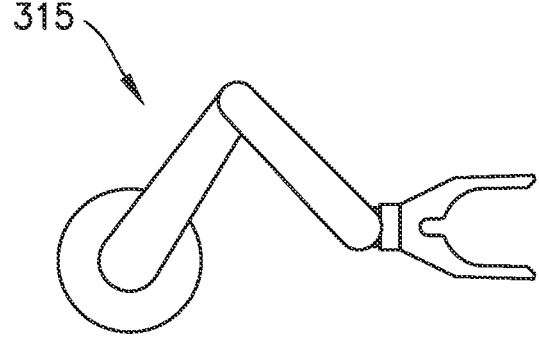
Figure 4D:
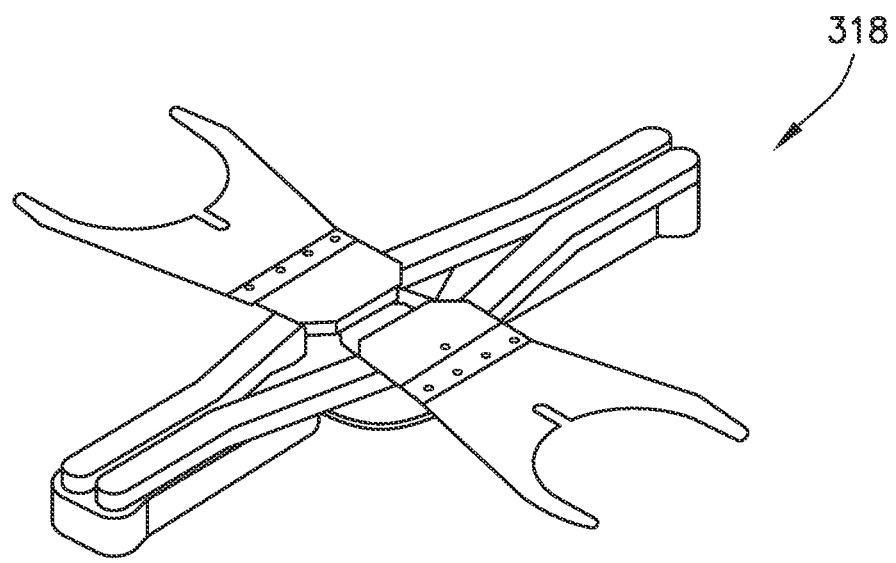
Figure 4E:
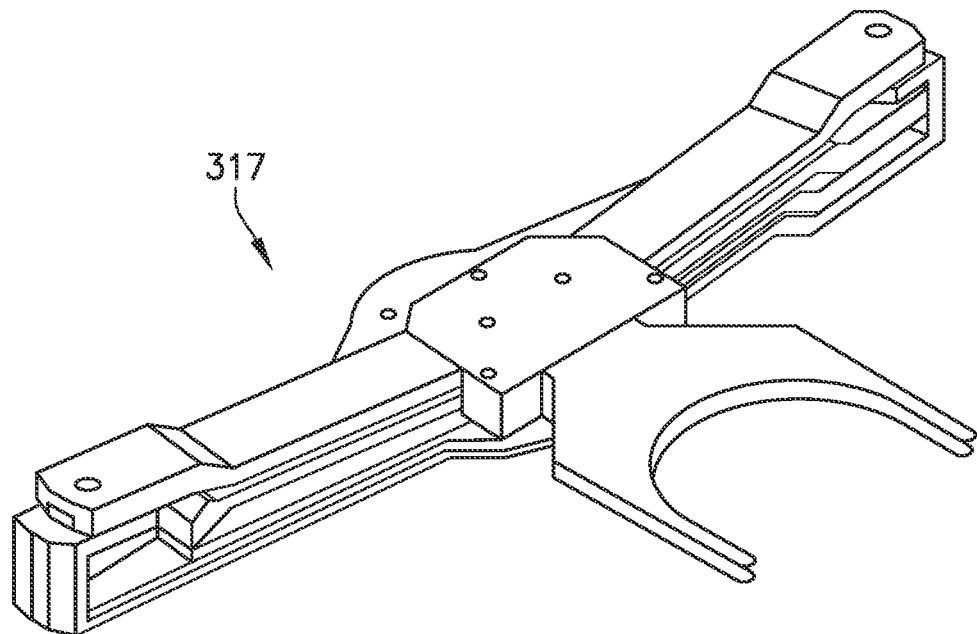

Referring now to FIGS. 4A-4E, the robotic manipulator 400 of FIG. 3 may include any suitable arm linkage mechanism(s). Suitable examples of arm linkage mechanisms can be found in, for example, U.S. Pat. No. 7,578,649 issued Aug. 25, 2009, U.S. Pat. No. 5,794,487 issued Aug. 18, 1998, U.S. Pat. No. 7,946,800 issued May 24, 2011, U.S. Pat. No. 6,485,250 issued Nov. 26, 2002, U.S. Pat. No. 7,891,935 issued Feb. 22, 2011, U.S. Pat. No. 8,419,341 issued Apr. 16, 2013 and U.S. patent application Ser. No. 13/293,717 entitled "Dual Arm Robot" and filed on Nov. 10, 2011 and Ser. No. 13/861,693 entitled "Linear Vacuum Robot with Z Motion and Articulated Arm" and filed on Sep. 5, 2013 the disclosures of which are all incorporated by reference herein in their entireties. In aspects of the disclosed embodiment, the at least one transfer arm of each transport unit module 104, the boom arm 143 and/or the linear slide 144 may be derived from a conventional SCARA arm 315 (selective compliant articulated robot arm) (FIG. 4C) type design, which includes an upper arm 315U, a band-driven forearm 315F and a band-constrained end-effector 315E, or from a telescoping arm or any other suitable arm design, such as a Cartesian linearly sliding arm 314 (FIG. 4B). Suitable examples of transport arms can be found in, for example, U.S. patent application Ser. No. 12/117,415 entitled "Substrate Transport Apparatus with Multiple Movable Arms Utilizing a Mechanical Switch Mechanism" filed on May 8, 2008 and U.S. Pat. No. 7,648,327 issued on Jan. 19, 100G, the disclosures of which are incorporated by reference herein in their entireties. The operation of the transfer arms may be independent from each other (e.g. the extension/retraction of each arm is independent from other arms), may be operated through a lost motion switch or may be operably linked in any suitable way such that the arms share at least one common drive axis. In still other aspects the transport arms may have any other desired arrangement such as a frog-leg arm 316 (FIG. 4A) configuration, a leap frog arm 317 (FIG. 4E) configuration, a bi-symmetric arm 318 (FIG. 4D) configuration, etc. Suitable examples of transport arms can be found in U.S. Pat. No. 6,231,297 issued May 15, 2001, U.S. Pat. No. 5,180,276 issued Jan. 19, 1993, U.S. Pat. No. 6,464,448 issued Oct. 15, 2002, U.S. Pat. No. 6,224,319 issued May 1, 2001, U.S. Pat. No. 5,447,409 issued Sep. 5, 1995, U.S. Pat. No. 7,578,649 issued Aug. 25, 2009, U.S. Pat. No. 5,794,487 issued Aug. 18, 1998, U.S. Pat. No. 7,946,800 issued May 24, 2011, U.S. Pat. No. 6,485,250 issued Nov. 26, 2002, U.S. Pat. No. 7,891,935 issued Feb. 22, 2011 and U.S. patent application Ser. No. 13/293,717 entitled "Dual Arm Robot" and filed on Nov. 10, 2011 and Ser. No. 13/270,844 entitled "Coaxial Drive Vacuum Robot" and filed on Oct. 11, 2011 the disclosures of which are all incorporated by reference herein in their entireties.

Figure 5A:
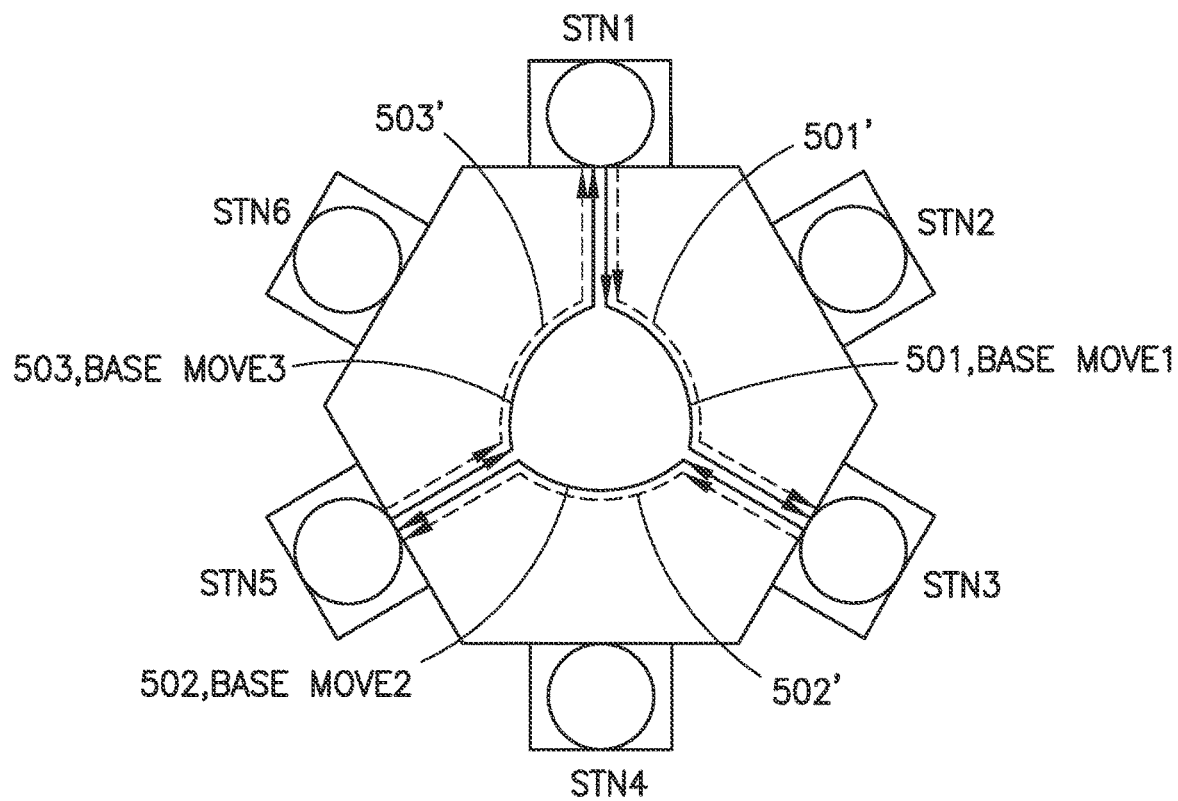
FIG. 5A is a schematic illustration of a portion of the automated material handling platform showing base moves and in situ process moves in accordance with aspects of the disclosed embodiment.

Still referring to FIGS. 2-4E the robotic manipulators 306, 311, 400 described herein transport substrates S (see FIGS. 4A and 4B) between points in space, such as substrate holding stations STN1-STN6 illustrated in FIG. 5A. In order to accomplish the transport of substrates S a motion control algorithm runs in any suitable controller of the automated material handling platform 300, such as robot controller (also referred to as a robotic manipulator controller) 319, 323, 422, 423A-423C, 810 (see FIGS. 2, 3 and 8A), that is connected to the robotic manipulator 306, 311, 400. The motion control algorithm defines the desired substrate path in space and a position control loop calculates the desired control torques (or forces) to apply for each robot actuator that is responsible for moving each respective robot degree-of-freedom in space.

The robotic manipulators 306, 311, 400 (which may be referred to as automated systems) are expected to perform the repetitive task of transferring substrates S continuously and the robotic manipulators are subjected to the environmental conditions associated with the processing of such substrates. It is advantageous to have a method and apparatus, as provided by the aspects of the disclosed embodiment, to monitor robotic manipulator (or any other automated equipment of the automated material handling platform 300) performance over time and determine (predictive diagnostics) if the respective robotic manipulator 306, 311, 400 is able to operate within expected parameters in order to handle its primary task such as carrying and transferring the substrates between substrate holding stations STN1-STN6.

In accordance with the aspects of the disclosed embodiment, the health assessment of, for example, the robotic manipulator 306, 311, 400 is performed by generating a base statistic signature (e.g. a baseline or statistical representation of the behavior of a given variable operating in typical environmental conditions) that characterizes each dynamic performance variable output by the robotic manipulator 306, 311, 400 for a set of base moves/motions (the terms move and motion are used interchangeably herein) 820, 820A, 820B 820C (See FIG. 8A) of the robotic manipulator 306, 311, 400. The base statistic signature is generated by, for example, registering, with a registration system 801R (which may be formed by or resident in any suitable storage, such as storage 801) communicably coupled to any suitable controller of the automated material handling platform 300 such as controller 319, 323, 422, 423A, 423B, 423C, 810, predetermined operating data embodying at least one dynamic performance variable output by the robotic manipulator 306, 311, 400 effecting a predetermined motion base set of predetermined base motions.

Each of the dynamic performance variables is specific to the automated system (such as the robotic manipulator 306, 311, 400), which may be in a group of different automated systems (such as the group of automated systems that form the automated material handling platform 300) from which dynamic performance variable was obtained. As such, because each of the dynamic performance variables is specific to a respective one of the automated systems (of the group of automated systems) the base statistic signature of the respective automated system travels with the respective automated system. For example, robotic manipulator 306 located in the atmospheric section 301 of the automated material-handling platform 300 has a respective base statistic signature and robotic manipulator 311 located in the vacuum section 302 has a respective base statistic signature. If the robotic manipulator 311 was placed in the atmospheric section 301, the base statistic signature of the robotic manipulator 311 would still apply to the robotic manipulator 311 when placed within the atmospheric section 301. In one aspect, the base statistic signature is associated with the respective automated system in a memory and/or controller of the automated system. Further, each robotic manipulator may have unique operational characteristics that affect the base statistic signature of the respective robotic manipulator. For example, robotic manipulator 311 and another robotic manipulator may be manufactured as the same make and model robotic manipulator. However, due to, for example, manufacturing tolerances in the robotic drive systems and arm structures, the base statistic signature for robotic manipulator 311 may not be applicable to the other similar robotic manipulator and vice versa. As such, the base statistic signature for each robotic manipulator travels with the respective robotic manipulator (e.g. the base statistic signature $C_{pkbase}$ for robotic manipulator 311 travels with and is unique to robotic manipulator 311 and the base statistic signature $C_{pkbase}$ for robotic manipulator 306 travels with and is unique to robotic manipulator 306). Accordingly each apparatus, such as robotic manipulator 311, is unique and each normalized value or base statistic signature/value $C_{pkbase}$ for each predetermined base move 501, 502, 503 of the predetermined motion base set 820, 820A-820C and each other value $C_{pkother}$ for each mapped in situ process move 501', 502', 503' of the other predetermined motion set 830, 830A-830C are uniquely correlated with but the unique apparatus, and the determined performance deterioration rate (such as indicated by a linear trending model LTM—see FIG. 11) correlates uniquely with but the unique apparatus.

In one aspect, a system (such as the automated material handling platform 300 illustrated in FIG. 3) includes or is otherwise provided with a number of different unique apparatus (such as the aligner 307, robotic manipulator 306, fan filter unit 308, etc., listed in Table 1 and illustrated in FIG. 2) connected to each other and, for example, the transport apparatus 311, wherein each different unique apparatus from the number of different unique apparatus App(i) (schematically represented in FIG. 2A as App1-Appn) has different corresponding normalized values $C_{pkBasei}$ (which includes $C_{pkBase(1-n)}$) for each base move 501, 502, 503 of the predetermined motion base set 820, 820A-820C and other normalized values $C_{pkOtheri}$ for each mapped in situ process move 501', 502', 503' of the other predetermined motion set 830, 830A-830C that uniquely correlate to no more than that different corresponding unique apparatus App1-Appn from the number of different unique apparatus App(i). In one aspect, each (or at least one) different unique apparatus App1-Appn from the number of different unique apparatus App(i) is of common configuration with another one of the different unique apparatus App1-Appn. For example, robotic manipulator 306 may have a common configuration with robotic manipulator 311. In other aspects, each (or at least one) different unique apparatus App1-Appn from the number of different unique apparatus App(i) is of different configuration from another one of the different unique apparatus App(i). For example, the aligner 307 has a difference configuration than the robotic manipulator 306.

The dynamic performance variables of each automated apparatus and/or system can be directly measured (i.e. continuous monitoring variables) or derived from available measurements (i.e. derived variables). Examples of the dynamic performance variables include:

Mechanical or electrical power;

Mechanical work;

Robot end-effector acceleration;

Motor PWM duty: PWM duty of a motor is the percentage of input voltage that is supplied to each motor phase at any given time. The duty cycle at each of the motor phases is available to the health-monitoring and fault-diagnostic system;

Motor current: Motor current represents the current flowing through each of the three phases of each of the motors. The motor current may be obtained as an absolute value or as a percentage of the maximum current. If obtained as an absolute value it has units of Amps. Motor current values can in turn be used to compute motor torques using the motor torque-current relationships;

Actual position, velocity and acceleration: These are the position, velocity and acceleration of each of the motor axes. For rotational axes, the position, velocity and acceleration values are in units of degrees, degrees/sec and degrees/sect respectively. For translational axes, the position, velocity and acceleration values are in units of mm, mm/sec and mm/sect respectively;

Desired position, velocity and acceleration: These are the position, velocity and acceleration values that the controller commands the motors to have. These properties have similar units as the actual position, velocity and acceleration above;

Position and velocity tracking error: These are the differences between the respective desired and actual values. These properties have similar units as the actual position, velocity and acceleration above;

Settling time: This is the time it takes for the position and velocity tracking errors to settle within specified windows at the end of motion;

Encoder analog and absolute position outputs: The motor position is determined by the encoders which output two types of signals—analog signals and absolute position signals. Analog signals are sine and cosine signals in units of mVolts. Absolute position signals are non-volatile integer values that indicate the number of analog sine cycles or an integer multiple of analog sine cycles that have gone by. Typically, digital outputs are read on power up and thereafter the axis position is determined solely from the analog signals;

Gripper state: This is the state of the gripper—open or closed. In the case of a vacuum-actuated edge-contact gripper, it is the blocked/unblocked state of one or more sensors;

Vacuum system pressure: This is the vacuum level measured by a vacuum sensor. This is an analog sensor whose output is digitized by an analog-to-digital converter. In the case of a suction gripper, the vacuum level indicates whether the wafer has been gripped;

Substrate-presence sensor state: In a passive grip end effector, the wafer presence sensor output is a binary output. In a vacuum-actuated edge-contact grip end effector, the wafer presence is determined from the output state of two or more sensors each of which is binary;

Mapper sensor state: This is the state of the mapper sensor—blocked or unblocked at any given instance;

Substrate Mapper/Aligner detector light intensity: This is a measure of the intensity of the light detected by a light detector of a substrate mapper or aligner. This signal is typically available as an integer value (that may have a range of 0-1024 as an example);

Substrate mapper sensor position capture data: This is the array of robot axis position values at which the mapper sensor changes state;

Vacuum valve state: This is the commanded state of the vacuum valve. It specifies if the solenoid that operates the vacuum valve is supposed to be energized;

Voltage at fuse output terminals: The voltages at the output terminals of each of the fuses in the motor control circuitry is monitored. A blown fuse results in low output terminal voltage;

Substrate alignment data: These are the substrate eccentricity vector and angular orientation of the alignment fiducial of a substrate reported by the aligner;

Position data at transition of external substrate sensors: In some cases, the atmospheric and vacuum sections of the tool may be equipped with optical sensors which detect the leading and trailing edges of a substrate carried by the robot. The robot position data corresponding to these events are used for on-the-fly recognition of the eccentricity of the substrate on the robot end-effector;

Substrate cycle time: This is the time it takes for a single substrate to be processed by the tool, typically measured under steady flow conditions;

Mini-environment pressure: This is the pressure measured by a pressure sensor in the atmospheric section of the tool.

Particular examples of the continuous monitoring variables include:

TABLE 3

Continuous monitoring variables

| Name | Units_Short | Units_Long |
|---|---|---|
| T1 position actual | deg | Degrees |
| T2 position actual | deg | Degrees |
| Z position actual | m | Meters |
| T1 velocity actual | deg/sec | Degrees per second |
| T2 velocity actual | deg/sec | Degrees per second |
| Z velocity actual | m/sec | Meters per second |
| T1 acceleration actual | deg/sec2 | Degrees per second squared |
| T2 acceleration actual | deg/sec2 | Degrees per second squared |
| Z acceleration actual | m/sec2 | Meters per second squared |
| T1 acceleration command | deg/sec2 | Degrees per second squared |
| T2 acceleration command | deg/sec2 | Degrees per second squared |
| Z acceleration command | m/sec2 | Millimeters per second squared |
| T1 position error | deg | Degrees |
| T2 position error | deg | Degrees |
| Z position error | deg | Degrees |
| T1 torque actual | N | Newton-meters |
| T2 torque actual | N | Newton-meters |
| Z torque actual | N | Newton-meters |
| T1 torque modeled | N | Newton-meters |
| T2 torque modeled | N | Newton-meters |
| Z torque modeled | N | Newton-meters |
| T1 current actual | A | Amps |
| T2 current actual | A | Amps |
| Z current actual | A | Amps |
| Bus motor voltage | V | Volts |
| Bus 24 V rail | V | Volts |
| Bus 12 V rail | V | Volts |
| Bus 5 V rail | V | Volts |
| Bus 3.3 V rail | V | Volts |
| Core temperature | C | Celsius |
| FPGA core supply voltage | V | Volts |
| FPGA io supply voltage | V | Volts |
| Processor core supply voltage | V | Volts |
| Processor io supply voltage | V | Volts |
| DDR supply voltage | V | Volts |
| T1 temperature | C. | Celsius |
| T2 temperature | C. | Celsius |
| Z temperature | C. | Celsius |
| T1 servo Status | bitwise | Bitwise |
| T2 servo Status | bitwise | Bitwise |
| Z servo Status | bitwise | Bitwise |
| T1 encoder CRC error counter | count | Counter |
| T2 encoder CRC error counter | count | Counter |
| Z encoder CRC error counter | count | Counter |
| T1 encoder warning flag counter | count | Counter |
| T2 encoder warning flag counter | count | Counter |
| Z encoder warning flag counter | count | Counter |
| T1 encoder error flag counter | count | Counter |
| T2 encoder error flag counter | count | Counter |
| Z encoder error flag counter | count | Counter |
| T1 command position | deg | Degrees |
| T2 command position | deg | Degrees |

TABLE 3-continued

Continuous monitoring variables

| Name | Units_Short | Units_Long |
|---|---|---|
| Z command position | m | Meters |
| Radial command position | m | Meters |
| Radial command position arm B | m | Meters |
| Theta command position | deg | Degrees |
| Theta command position arm B | deg | Degrees |
| Radial position error | m | Meters |
| Radial position error arm B | m | Meters |
| Tangential position error | m | Meters |
| Tangential position error arm B | m | Meters |
| Command compound acceleration | g | g |
| Command compound acceleration arm B | g | g |
| Actual compound acceleration | g | g |
| Actual compound acceleration arm B | g | g |
| CPU core 0 utilization | % | Percentage |
| CPU core 1 utilization | % | Percentage |
| Total system RAM | B | Bytes |
| Available system RAM | B | Bytes |
| Used system RAM | B | Bytes |
| Used percent system RAM | % | Percentage |
| Total disk 0 space | B | Bytes |
| Available disk 0 space | B | Bytes |
| Used disk 0 space | B | Bytes |
| Used percent disk 0 space | % | Percentage |
| Processor PCB temperature | C. | Celsius |
| RTC battery low flag | Bool | Boolean |
| Number of controller boot cycles | count | Count |
| Controller hardware on time | days | Days |
| Total cycle count | count | Count |
| Fan controller internal temperature | C. | Celsius |
| Fan 0 speed | RPM | RPM |
| Fan 0 error flag | Bool | Boolean |
| Fan 1 speed | RPM | RPM |
| Fan 1 error flag | Bool | Boolean |

Where T1 and T2 are robotic manipulator drive rotation axes (there could be more or less than two rotation drive axes); Z is the robot drive Z axis; CPU is the robot controller (such as controller 319, 323, 422, 423A-423C, 800); Fan 0, Fan 1 are the various fans of the robotic manipulator; theta is rotation of the robotic manipulator arm; and R is the extension of the robotic manipulator arm.

Particular examples of derived variables include:

TABLE 4

Derived variables

| Name | Units_Short | Units_Long |
|---|---|---|
| T1 servo status duration | days | Days |
| T2 servo status duration | days | Days |
| Z servo status duration | days | Days |
| T1 servo status | bool | Boolean |
| T2 servo status | bool | Boolean |
| Z servo status | bool | Boolean |
| T1 mechanical power | W | Watts |
| T2 mechanical power | W | Watts |
| Z mechanical power | W | Watts |
| T1 electrical power | W | Watts |
| T2 electrical power | W | Watts |
| Z electrical power | W | Watts |
| T1 motor efficiency | % | percentage |
| T2 motor efficiency | % | percentage |
| Z motor efficiency | % | percentage |
| T1 incremental energy | J | Joules |
| T2 incremental energy | J | Joules |
| Z incremental energy | J | Joules |
| T1 incremental position | deg | Degrees |
| T2 incremental position | deg | Degrees |
| Z incremental position | m | Meters |
| Position loop average execution time | us | Microseconds |
| Position loop max execution time | us | Microseconds |

TABLE 4-continued

Derived variables

| Name | Units_Short | Units_Long |
|---|---|---|
| Position loop average signal delay time | us | Microseconds |
| Position loop max signal delay time | us | Microseconds |
| Current loop average execution time | us | Microseconds |
| Current loop max execution time | us | Microseconds |
| IO loop average interval time | ms | Milliseconds |
| IO loop max interval time | ms | Milliseconds |
| IO loop average execution time | ms | Milliseconds |
| IO loop max execution time | ms | Milliseconds |
| T1 encoder CRC error flag | count | Counter |
| T2 encoder CRC error flag | count | Counter |
| Z encoder CRC error flag | count | Counter |
| T1 encoder warning flag | count | Counter |
| T2 encoder warning flag | count | Counter |
| Z encoder warning flag | count | Counter |
| T1 encoder error flag | count | Counter |
| T2 encoder error flag | count | Counter |
| Z encoder error flag | count | Counter |

Such dynamic performance variables are calculated from raw or direct measurements such as motor position, velocity, acceleration and control torques.

The predetermined base moves 501, 502, 503 of the predetermined motion base set 820, 820A-820C include a statistically characterizing number of at least one common base move (e.g. a move that forms a baseline and is created from enough samples moves that are collected to define a statistically meaningful batch) defining a base motion type. For example, a (each) motion base set 820, 820A-820C (see FIG. 8A) for a respective base move 501, 502, 503 (e.g. base move 501 has the motion base set 820A, base move 502 has the motion base set 820B, base move 503 has the motion base set 820C) is substantially a minimum number of moves $N_{min}$ (see FIG. 6) (e.g. sample size) sufficient to provide a statistically meaningful standard deviation based on a given convergence criterion to characterize the motion base set (or move set) 820, 820A-820C for a specific robotic manipulator 306, 311, 400. As such, each dynamic performance variable is specific to and output by a respective robotic manipulator 306, 311, 400.

The predetermined base moves 501, 502, 503, of the respective predetermined motion base set 820, 820A-820C, include a number of different base motion types, each of which is effected by the transport apparatus 306, 311, 400 in a statistically characterizing number of common motions for each base motion type. Each of the different base motion types has a different corresponding at least one torque command characteristic and position command characteristic defining a different common motion respective to each base motion type. In one aspect, the predetermined base motion set 820, 820A-820C may be of one or more move/motion types. For example, the respective moves 501, 502, 503 in the base motion set 820, 820A-820C may be simple moves or complex (e.g. blended) moves that are characterized by torque and position commands that define the respective move.

Figure 5B:
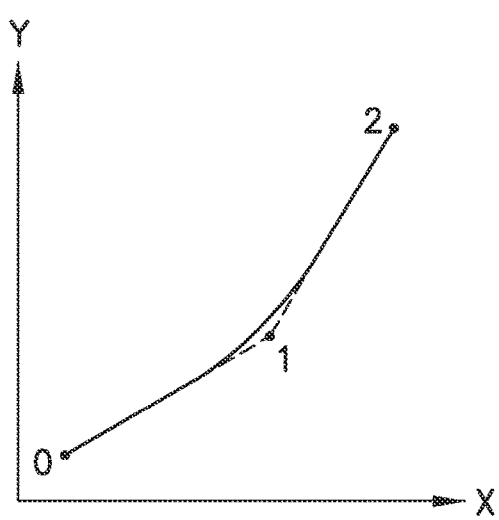
FIGS. 5B and 5C are schematic illustrations of simple and complex moves in accordance with aspects of the disclosed embodiment.
Figure 5C:
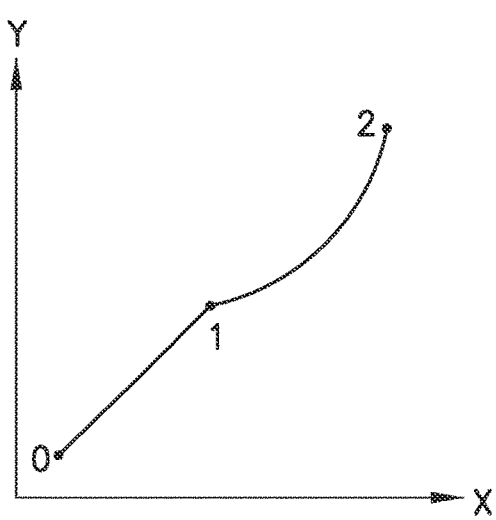

A simple move is a straight line move between two points (as illustrated in FIG. 5C from point 0 to point 1) or a move in a circular arc between two points (as illustrated in FIG. 5C from point 1 to point 2) along one of the theta axis, the extension axis or the Z axis of the robotic manipulator 306, 311, 400 (e.g. a one degree of freedom move).

A complex or blended move is a move in which more than two simple moves are blended together as illustrated in FIG. 5B where the move extends from point 0 to point 2 with a blended path adjacent point 1 that blends the two straight line moves from points 0 to 1 and from points 1 to 2 along at least two of the theta axis, the extension axis or the Z axis of the robotic manipulator 306, 311, 400 (e.g. a two or more degree of freedom move).

Each of the motion base sets 820, 820A-820C may also be characterized by position of the moves within the set (e.g. a start and end point of the moves), load parameters of the moves within the set (e.g. the robotic manipulator 306, 311, 400 is loaded (carrying a substrate) or unloaded (not carrying a substrate)), and/or dynamic conditions at the initial and/or final positions of the move (e.g. motion/stop, stop/stop, stop/motion, motion/motion, etc.). For example, referring to the complex move in FIG. 5B, the dynamic condition point 0 is stopped and the dynamic condition at point 2 is stopped. Referring to the two simple moves in FIG. 5C, the dynamic condition at point 0 is stopped and the dynamic condition at point 1 is moving; while the dynamic condition at point 2 is stopped. As described above, while the move types have been described with respect to robotic manipulator arm motion in one, two or three degrees of freedom it should be understood that the move types may include moves generated with any suitable number of degrees of freedom or a single degree of freedom (such as with a vacuum pump, substrate aligner, etc.).

Each move type effects the minimum number of moves $N_{min}$ that statistically characterizes each move type. For example, each dynamic performance variable or motion type may be represented in an historical manner as:

$$TMAH = \begin{bmatrix} s_0 \\ \vdots \\ s_n \\ s_{n+1} \\ \vdots \\ s_{n+1+m_i} \end{bmatrix}_{j=0}^{i=0} \begin{bmatrix} s_0 \\ \vdots \\ s_n \\ s_{n+1} \\ \vdots \\ s_{n+1+m_i} \end{bmatrix}_{j=-1}^{i=0} \begin{bmatrix} s_0 \\ \vdots \\ s_n \\ s_{n+1} \\ \vdots \\ s_{n+1+m_i} \end{bmatrix}_{j=0}^{i=1} \begin{bmatrix} s_0 \\ \vdots \\ s_n \\ s_{n+1} \\ \vdots \\ s_{n+1+m_i} \end{bmatrix}_{j=-2}^{i=0} \quad (1)$$

where s is a base move/motion signal provided in Table 5 through Table 7. Signals $s_0$ through $s_n$ are signals with a scalar output and should be able to be compared across different template moves (which may also be referred to as base moves), i.e., compare motor energy relative to the baseline across different move types. Signals $s_{n+1}$ through $s_{n+1+m_i}$ are vector output signals from Table 8 and cannot be compared across different template move types, indicated by i.

TABLE 5

Derived signals over base move, per motor, with scalar output

| Metric | Description | Units |
|---|---|---|
| Peak | Tracking error | degrees |
| RMS | Tracking error | degrees |
| Peak | Torque error | Newton-meters |
| RMS | Torque error | Newton-meters |
| Peak | Current | Amps |
| RMS | Current | Amps |
| Peak | Duty cycle as percentage of available torque | Percent |
| Peak | Mechanical power | Watts |
| Mean | Motor efficiency | Percent |
| Sum | Mechanical energy | Joules |
| Mean | Winding temperature | Celsius |

TABLE 5-continued

Derived signals over base move, per motor, with scalar output

| Metric | Description | Units |
|---|---|---|
| Sum | Vibration power, over configurable Hz range | dB |
| Peak | Vibration power | dB/Hz |
| Peak | Vibration power crest factor | dB/Hz |

TABLE 6

Derived signals over base move, per arm or end-effector, with scalar output

| Metric | Description | Units | Condition |
|---|---|---|---|
| Peak | Settling time | Seconds | Fine settling |
| Peak | Settling radial error | Meters | Fine settling |
| Peak | Settling tangential error | Meters | Fine settling |
| Peak | Handoff compound error | Meters | At: R EX Change: Z state |
| Peak | Tangential tracking error | Meters | Change: R state |
| RMS | Tangential tracking error | Meters | Change: R state |
| Peak | Composed acceleration, | g | |

TABLE 7

Derived system signals over base move, with scalar output

| Metric | Description | Units |
|---|---|---|
| Peak | Motor bus voltage drop | Volts |
| Peak | Cumulative motor mechanical power | Watts |
| Sum | Cumulative motor mechanical energy | Joules |

TABLE 8

Derived signals over base move, with vector output

| Description | Units |
|---|---|
| Position error, per motor | Degrees |
| Actual Torque, per motor | Newton-meters |
| Tangential error, per arm or end-effector | Meters |
| Radial error, per arm or end-effector | Meters |

These vector output signals have a signal at each time sample along the trajectory and therefore the number of these signals differs between different moves and there is no physical significance to the assessment at a time sample in one move versus another. The base move (type) index is indicated by i and the history of a given index is indicated by j.

The last assessed base move in this example is $$TMAH_0 = \begin{bmatrix} s_0 \\ \vdots \\ s_n \\ s_{n+1} \\ \vdots \\ s_{n+1+m_i} \end{bmatrix}_{j=0}^{i=0} \quad (2)$$

And the 3$^{rd}$ last assessed base move in this example is $$TMAH_{-2} = \begin{bmatrix} \begin{bmatrix} s_0 \\ \vdots \\ s_n \\ s_{n+1} \\ \vdots \\ s_{n+1+m_i} \end{bmatrix}_{j=-2}^{i=1} \end{bmatrix} \quad (3)$$

Referring to FIGS. 5A-5C, the base moves, such as base moves 501, 502, 503 in the respective set of base moves 820, 820A-820C may also be referred to as template moves. A base move 501, 502, 503 is a repeated move along a unique path. The base moves 501, 502, 503 can be composed of simple moves, or complex moves as described above.

Characteristic data is analyzed along unique path of the base move with respect to a baseline in order to assess system performance degradation and performance trends. The base move 501, 502, 503 can be defined theoretically and/or empirically. For example, a theoretical base move is based on expected design configuration and process of the process tool to resolve expected moves in operation and then executed any time, before or after in situ process tool installation.

Figure 6:
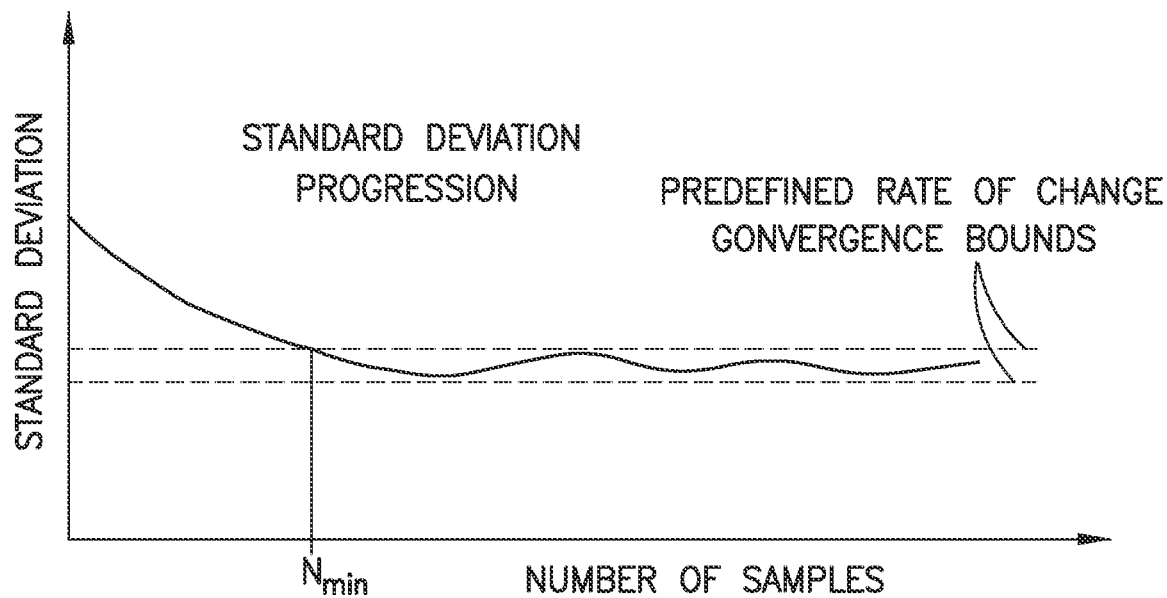
FIG. 6 is an exemplary chart illustrating statistical convergence of a sample of moves performed by the apparatus of FIG. 3 in accordance with aspects of the disclosed embodiment.
Figure 7:
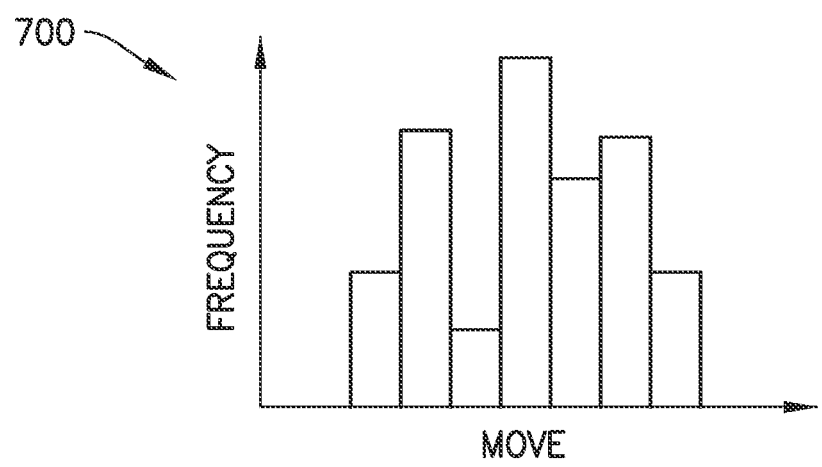
FIG. 7 is an exemplary move histogram in accordance with aspects of the disclose embodiment.

An empirical base move may be generated from in situ process move commands as moves of desired occurrence commonality to generated sufficient statistical characteristics to have a meaningful statistical value that settles between predefined rate of change convergence bounds as illustrated in FIG. 6 (where N$_{min}$ in FIG. 6 is the minimum number of moves (e.g. sample size) sufficient to provide a statistically meaningful standard deviation base on a given convergence criterion). Generation of the empirical base move may be a two part process (applied similarly to empirical generation of base statistic signature). For example, generating the empirical base move may include: accessing an in situ move command histogram 700 (see FIG. 7) and identifying in situ moves with commands (e.g. torque, position, boundary parameters, command trajectory path (encompasses speed and move duration), load condition, etc.) that map to the base move 501, 502, 503 (e.g. the in situ move matches the base move within a configurable tolerance); and accessing each dynamic performance variable output by a respective robotic manipulator 306, 311, 400, for the mapped motion, from a registry 840 of any suitable registration system 801R, that registers predetermined operating data embodying the at least one dynamic performance variable output by the robotic manipulator to effect a determination of the other predetermined motion set 830 (described below).

The generation of the empirical base move may be performed in near real time, run in the background and accessing the registry 840 without accessing the controller 319, 323, 422, 423A, 423B, 423C, 800 and associated bidirectional communication/data channels of the automated material handling platform 300. The in situ move command histogram 700 includes motions commanded by the robotic manipulator controller (such as controller 319, 323, 422, 423A, 423B, 423C, 800) including in situ process motions effected by the respective robotic manipulator 306, 311, 400. The in situ move command histogram 700 may be registered, in any suitable registry 700R (see FIG. 8A) of, e.g., the robotic manipulator controller (such as controller 319, 323, 422, 423A, 423B, 423C, 810) or any other suitable controller of the automated material handling platform 300.

As described herein the robotic manipulator controller resolves the mapped motions from periodic access of the motion histogram 700 in the registry 700R.

For example, referring also to FIG. 8A, a motion resolver 800 resolves from the robotic manipulator 306, 311, 400 (see FIGS. 2 and 3) in situ process motion commands of the robot controller 319, 323, 422, 423A-423C, 810, where in situ process motions 501', 502', 503' (see FIG. 5A) effected by the transport apparatus map to the predetermined base motions 501, 502, 503 (each of which defines a corresponding template motion so that the in situ process motion map onto the respective template motions) of a predetermined motion base set (described below), and defines with the mapped in situ process motions 501', 502', 503' another predetermined motion set (described below) of the robot controller 319, 323, 422, 423A-423C, 810. For example, in situ process motion 501' maps to base motion 501, in situ process motion 502' maps to base motion 502, and in situ process motion 503' maps to base motion 503. It is noted, in a manner similar to that described above, each in situ process motion 501'-503' is characterized by at least one of a torque command and a position command from the apparatus controller, where the at least one of the torque command and the position command characterize the in situ process motion in at least one degree of freedom of motion of the robotic manipulator 306, 311, 400.

The motion resolver 800 may be included in the robot controller 319, 323, 422, 423A-423C, 810 as a module, the motion resolver 800 may be a remote processor communicably coupled to the robot controller 319, 323, 422, 423A-423C, 810, or the motion resolver 800 may be a distinct processor communicably linked with the robot controller 319, 323, 422, 423A-423C, 810.

The motion resolver 800 iterates through the in situ process moves 501', 502', 503' to identify those in situ process moves 501', 502', 503' with the required minimum number of moves N$_{min}$ as determined by the standard deviation convergence illustrated in, for example, FIG. 6. For example, as noted above, in order to create a baseline (e.g. establish a base move 501, 502, 503), there must be enough samples collected to define a statistically meaningful batch. The number of samples required to create a baseline depends on the physical nature of the variable being analyzed. For instance, it may take longer to define the typical (mean and standard deviation) statistics for a mechanical work of a given axis of motion of the robotic manipulator 306, 311, 400 than the peak control torque of the same axis executing the same motion. In order to remedy this situation, the size of the baseline is defined based on the statistical analysis of the data collected. For instance, the standard deviation can be calculated during the baseline data gathering up to a point where its value stabilizes within some bounds as illustrated in FIG. 6. In FIG. 6, the standard deviation of a given variable is plotted against the sample size. As the sample size increases, the standard deviation tends to converge within certain bounds. These bounds can be defined a priori or calculated in terms of the actual data set, for instance when the rate of change of the plot is under about +/−10% in variation; however, any suitable convergence methods and/or percentage of variation can be used.

Figure 8B:
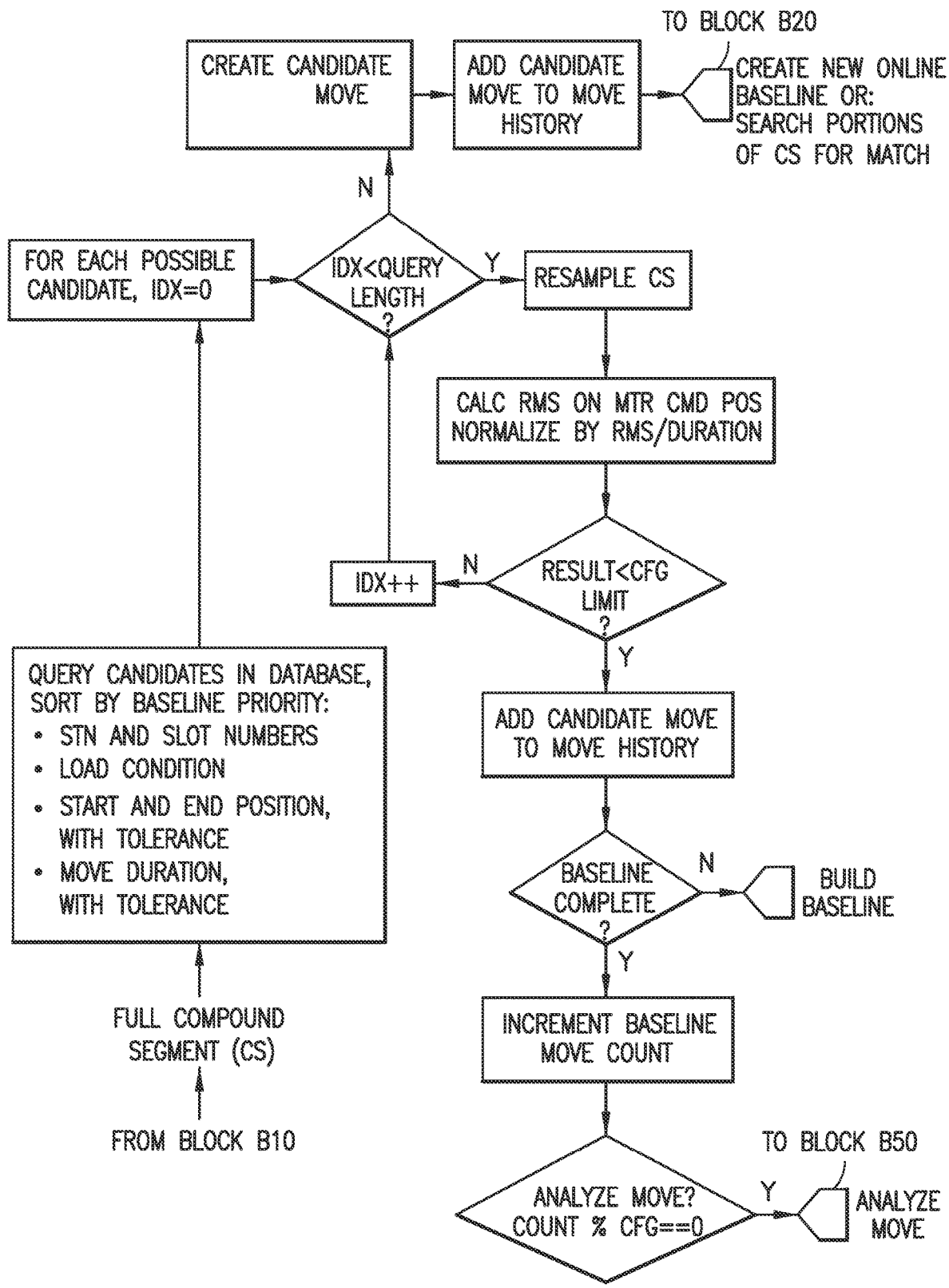
FIG. 8B is a schematic illustration of a portion of the exemplary process flow of FIG. 8A in accordance with aspects of the disclosed embodiment.

Referring still to FIG. 8A and FIGS. 5 and 8B, the moves that constitute at least the required minimum number of moves N$_{min}$ (e.g. the moves that are used to define the baseline) may be referred to as a predetermined motion base set 820. Each of the base moves 501, 502, 503 has a respective predetermined motion base set 820A, 820B, 820C that is unique to that base move 501, 502, 503. Exemplary process flows for determining and updating the respective predetermined motion base set 820A, 820B, 820C are illustrated in FIGS. 8A and 8B.

Still referring to FIGS. 5, 8A and 8B, in one aspect, once the motion resolver 800 identifies and resolves the predetermined motion base set 820A, 820B, 820C for a respective base move 501, 502, 503, the in situ process moves 501', 502', 503' that map (as described above) to a respective one of the base moves 501, 502, 503 are included in the respective predetermined motion base set 820A, 820B, 820C to update the respective predetermined motion base set 820A, 820B, 820C. In other aspects, the in situ process motions 501', 502', 503' that map to a predetermined motion base set 820A, 820B, 820C of a respective one of the base moves 501, 502, 503 may form a different set of motion type sets that is different from the predetermined motion base set 820A, 820B, 820C. The updated predetermined motion base set and/or the different set of motion type sets may be referred to as another predetermined motion set 830. As will be described herein, the other predetermined motion base set 830A, 830B, 830C for a respective in situ process move 501', 502', 503' is compared (as described herein) to the motion base set 820A, 820B, 820C for the respective base move 501, 502, 503 with respect to the health assessment and predictive diagnostics of the automated system being monitored, such as the robotic manipulator 300.

As described above, the health assessment of, for example, the robotic manipulator 306, 311, 400 (or other suitable automated equipment of the automated material handling platform 300) is performed by generating a base statistic signature (e.g. a baseline or statistical representation of the behavior of a given variable operating in typical environmental conditions) that characterizes each dynamic performance variable output by the robotic manipulator 306, 311, 400 for a set of base moves 820, 820A, 820B 820C (See FIG. 8A) of the robotic manipulator 306, 311, 400.

In one aspect, baseline metrics are captured/determined, with any suitable processor 810P (which in one aspect is substantially similar to processor 105) of the automated material handling platform 300. The processor 810P may be included in the robot controller 319, 323, 422, 423A-423C, 810 as a module, the processor 810P may be a remote processor communicably coupled to the robot controller 319, 323, 422, 423A-423C, 810 (and motion resolver 800), or the processor 810P may be a distinct processor communicably linked with the robot controller 319, 323, 422, 423A-423C, 810 (and motion resolver 800). The processor 810P is coupled to the registration system 801R in any suitable manner, while in other aspects the processor 810P includes the registration system 801R.

Figure 9:
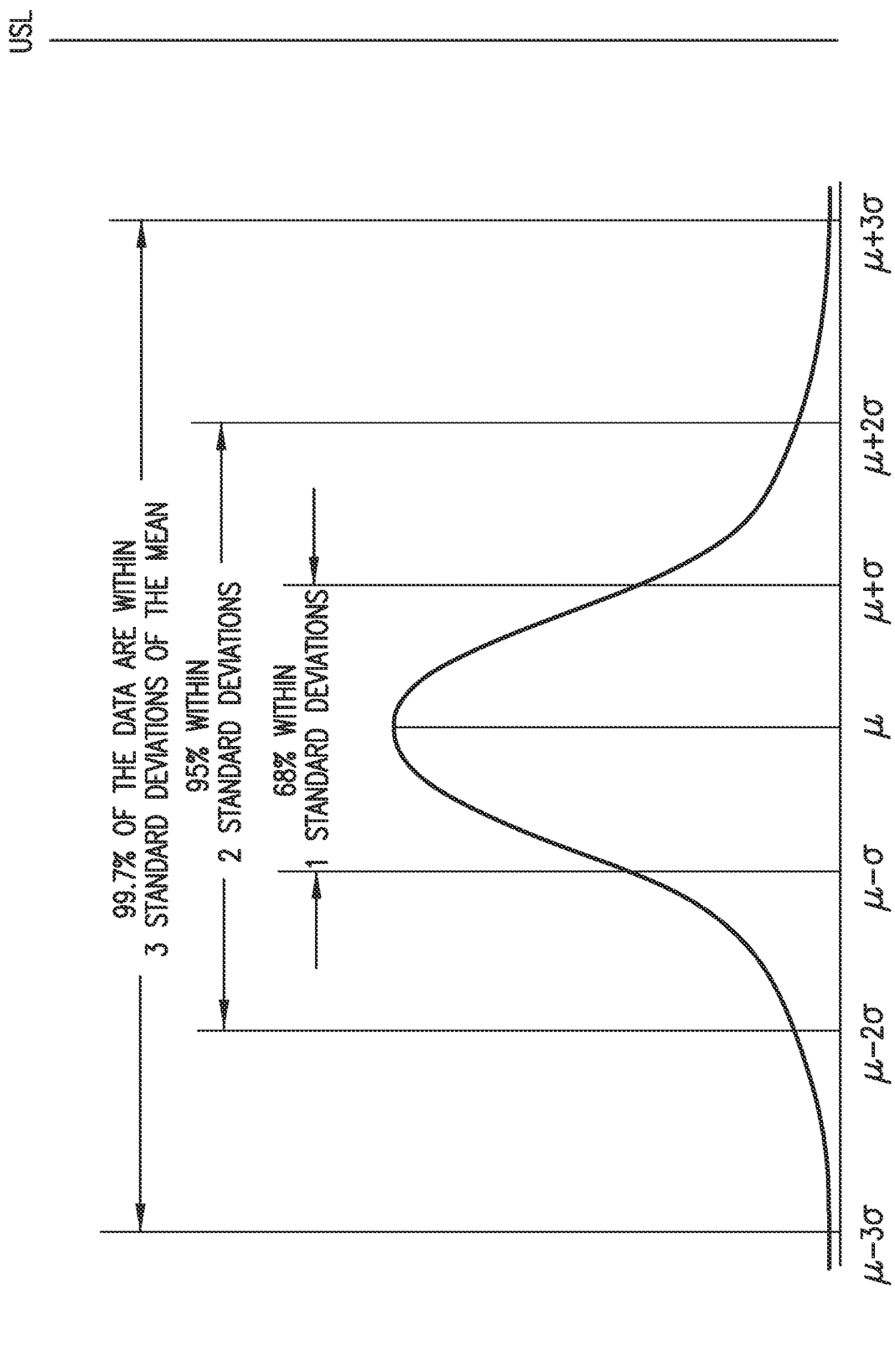
FIG. 9 is an exemplary Gaussian distribution of sample moves indicating upper and lower limits in accordance with aspects of the disclosed embodiment.

The baseline metrics are captured/determined by, for example, calculating the probability density function (PDF) of the base statistic signature, where the probability function can be represented as:

$$PDF = f(x|\mu, \sigma) = \frac{1}{\sigma\sqrt{2\pi}} e^{-\frac{(x-\mu)^2}{2\sigma^2}} \tag{4}$$

where μ is the dataset mean, x is the dynamic performance variable and σ is the standard deviation. FIG. 9 shows a typical Gaussian distribution with a mean and standard deviation. Also defined in FIG. 9 are the upper and lower specification limits (USL and LSL, respectively).

The base statistic signature of each dynamic performance variable of the respective robotic manipulator 306, 311, 400 (see FIGS. 2 and 3) is normalized for each different base move type (move type sets to base value) that characterizes the nominal/baseline of each dynamic performance variable specific to the respective robotic manipulator 306, 311, 400 for each different base mote type(s)/move type set(s). For example a base value (such as a process capability index $C_{pkBase}$) characterized by the respective probability density function PDF of each of the dynamic performance variable output by the respective robotic manipulator 306, 311, 400 for each motion of the predetermined motion base set is determined.

Generally, the process capability index $C_{pk}$ can be defined as:

$$C_{pk} = \min\left(\frac{\mu - 3\sigma}{LSL}, \frac{\mu + 3\sigma}{USL}\right) \tag{5}$$

where σ is the standard deviation and μ is the mean value of the samples collected for the respective variable. The process capability index $C_{pk}$ can be used as metrics to represent a baseline for the respective dynamic performance variable as the process capability index $C_{pk}$ captures mean and standard deviation of a population sample that is large enough to provide meaningful statistical data. The upper and lower specification limits USL, LSL can be determined in any suitable manner such as by defining the upper and lower specification limits USL, LSL as a function of the measured standard deviations of the respective robotic manipulator 306, 311, 400 being measured. For example:

$$USL = \mu + N\sigma \tag{6}$$

$$LSL = \mu - N\sigma \tag{7}$$

where N can be an integer larger than 3 so that the $C_{pk}$ can be a number larger than 1. As an example, if N=6 then the baseline process capability index $C_{pkBase}$ can be defined as:

$$C_{pkBase} = \min\left(\frac{\mu - 3\sigma}{\mu - 6\sigma}, \frac{\mu + 3\sigma}{\mu + 6\sigma}\right) \tag{8}$$

Figure 10:
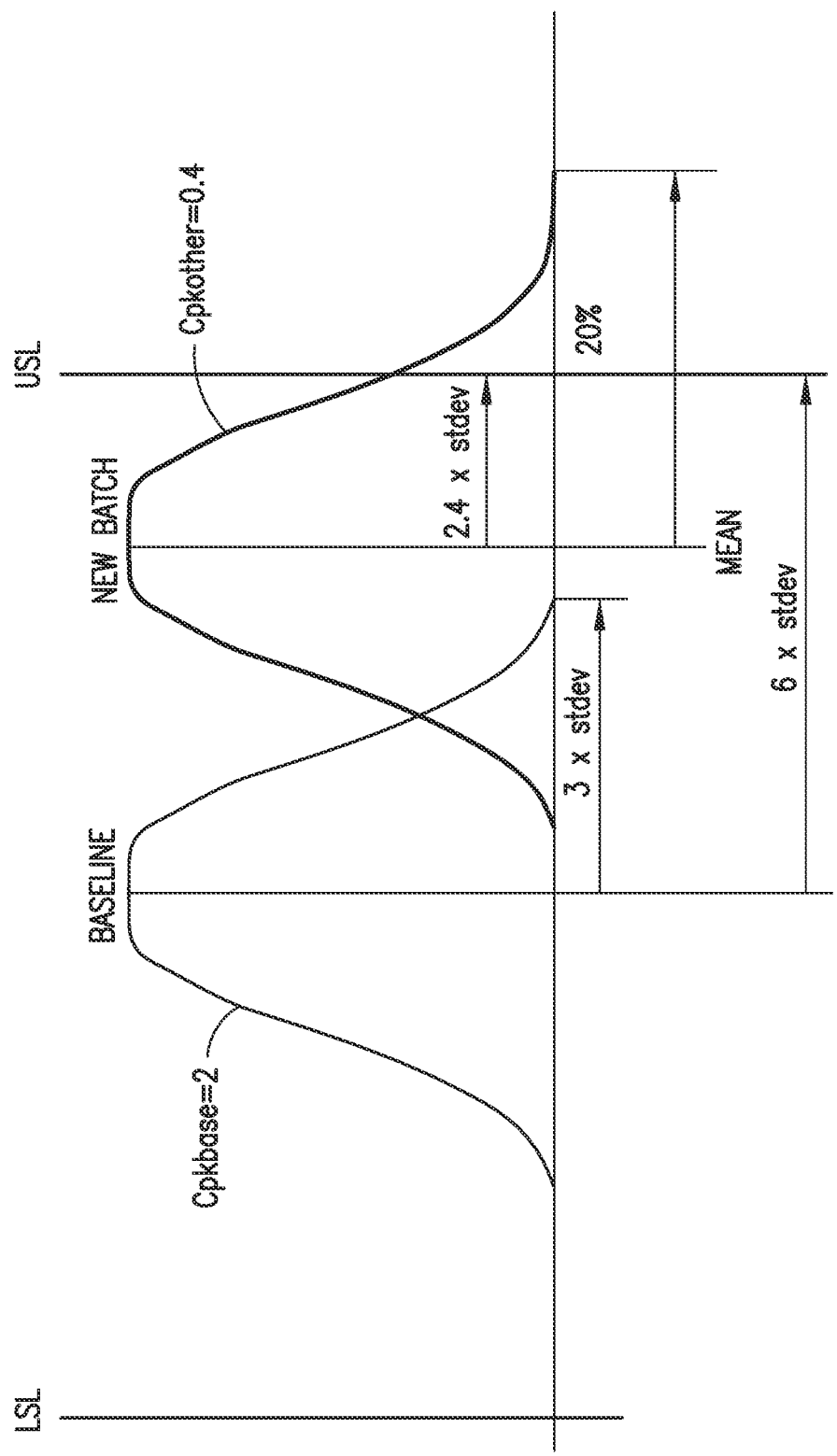
FIG. 10 is a graphic illustration of a comparison between a baseline value and another value generated from in situ process moves in accordance with aspects of the disclosed embodiment.

In one aspect, $C_{pkBase}$ may be set to 2.0 and based theoretically or empirically on the data set mean p of the baseline being +/−6σ to identify the upper and lower specification limits USL, LSL so that 99.9% of the sampled moves are captured (as illustrated in FIGS. 9 and 10). In other aspects, the upper and lower specification limits USL, LSL may be configured on a per signal basis when limits are well established, e.g., peak torque limits, maximum settling time, etc.

Figure 2A:
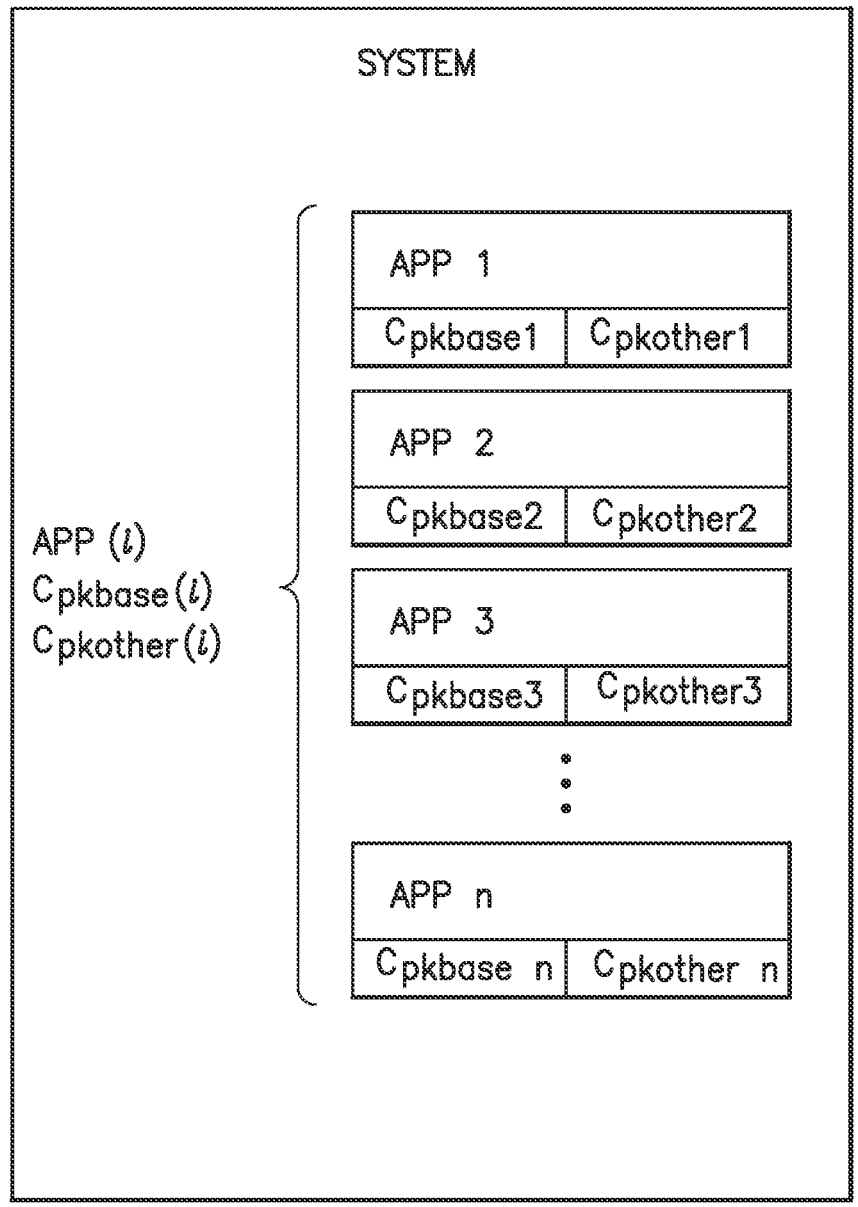
FIG. 2A is a schematic illustration of a system including a number of different unique apparatus in accordance with aspects of the disclosed embodiment.
Figure 11:
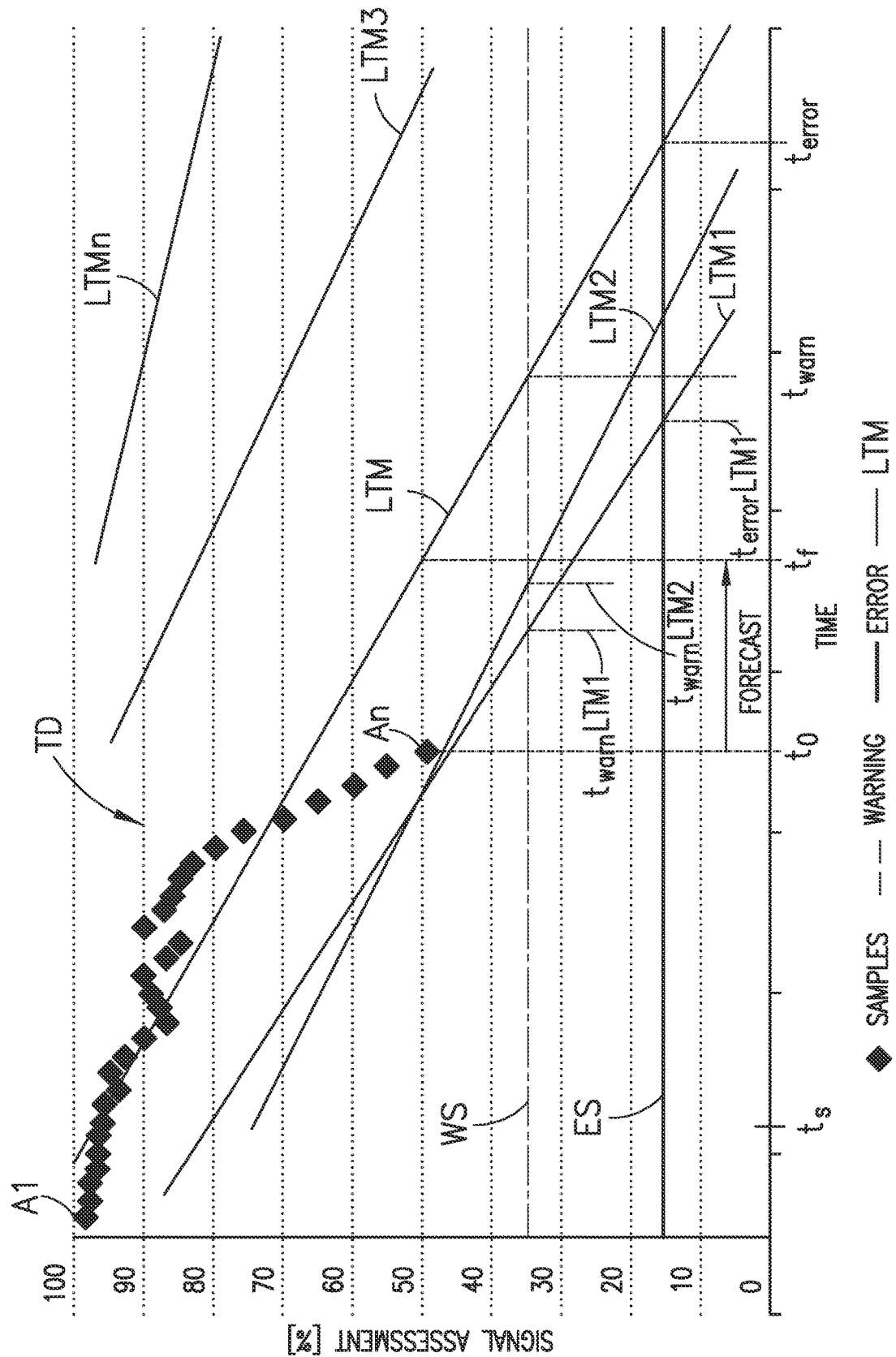
FIG. 11 is an exemplary illustration of an application of a health assessment of the apparatus of FIG. 3 with respect to predictive diagnostics in accordance with aspects of the disclosed embodiment.

In one aspect, referring also to FIG. 2A, the corresponding normalized values $C_{pkBase(1-n)}$ and other values $C_{pkOther(1-n)}$ for each respective different unique apparatus App1-Appn are registered in any suitable controller, such as a controller of a respective one of the apparatus App1-Appn. The normalized values $C_{pkBase(1-n)}$ and other values $C_{pkOther(1-n)}$, which are uniquely correlated to a respective one of the different unique apparatus App1-Appn, are compared to determine, for each of the different unique apparatus App1-Appn, on an apparatus by apparatus basis, a corresponding performance deterioration rate (indicated by, for example, a respective linear trending model LTM, see FIG. 11) as described in greater detail herein. For example, each respective apparatus App1-Appn has a respective linear trending model LTM1-LTMn as illustrated in FIG. 11.

Once the baseline metrics is established for each measurement variable (raw and derived), batches of in situ process moves 501'-503' are sampled during operation of the respective robotic manipulators 306, 311, 400. For example, in situ process moves 501', 502', 503' are generated by the controller, such as controller 319, 323, 422, 423A, 423B, 423C, 810, to identify another statistical signature specific to the robotic manipulator 306, 311, 400 being monitored. As described above, each dynamic performance variable for the set of in situ process moves are mapped to a respective base move (e.g. a base move type/type set(s)—see equations 1, 2 and 3). As described above, the mapped in situ process motions 501', 502', 503' are used to define the other predetermined motion set 830, 830A-830C of the respective robotic manipulator 306, 311, 400.

As with the baseline process moves 501-503, the in situ process moves 501'-503' process (another) statistical signature of each dynamic performance variable of the respective robotic manipulator 306, 311, 400 for each different in situ (another) move type/type set(s) (e.g. the other predetermined motion set 830, 830A-830C) are mapped to a respective predetermined motion base set 820, 830A-830C and normalized to an in situ (another) value $C_{pkOther}$ that characterizes the in situ performance of each dynamic performance variable of the respective robotic manipulator 306, 311, 400 for each of the different in situ move types (which may be simple moves or complex moves). The in situ (another) value $C_{pkOther}$ is a process capability index that is characterized by the probability density function PDF of each of the dynamic performance variable output by the robotic manipulator 306, 311, 400 effecting the mapped in situ process motions 501'-503' of the other predetermined motion set 830, 830A-830C. The in situ (other) value $C_{pkOther}$ references the upper and lower limits USL, LSL of the baseline to position other predetermined motion set relative to the predetermined motion base set as illustrated in FIG. 10 (where the other predetermined motion set is identified as the "new batch" and the predetermined motion base set is identified as the "baseline"). $C_{pkOther}$ is a process capability index can be defined as:

$$C^i_{pkOther} = \min\left(\frac{\mu - 3\sigma_i}{LSL}, \frac{\mu + 3\sigma_i}{USL}\right)_i \quad (9)$$

where i is an iteration of $C_{pkOther}$ being assessed. The normalized in situ (another) value $C_{pkOther}$ is compared to the normalized base value $C_{pkBase}$ for each respective dynamic performance variable being monitored, such as for each move type and across move types.

The comparison between the in situ (another) value $C_{pkOther}$ and the base value $C_{pkBase}$ may be performed by the processor 810P or any other suitable controller of the automated material handling platform 300, where the respective robotic manipulator 306, 311, 400 is a common transport apparatus for both the predetermined motion base set 820, 820A-820C and the other predetermined motion set 830, 830A-830C (and the corresponding in situ (another) value $C_{pkOther}$ and the base value $C_{pkBase}$). The comparison between the in situ (another) value $C_{pkOther}$ and the base value $C_{pkBase}$ effects a health assessment of each dynamic performance variable being monitored for a specific apparatus, such as a respective robotic manipulator 306, 311, 400, by providing for tracking how much each dynamic performance variable deviates or drifts from its baseline (see FIG. 10). The health assessment for each of the performance variables can be defined as a relative deviation from its baseline as:

$$\text{Assessment} = \frac{C^i_{pkOther}}{C_{pkBase}} \times 100\% \quad (10)$$

This means that an assessment of 100% represents a perfect statistical match between the in situ (another) value $C_{pkOther}$ and the base value $C_{pkBase}$. Equation (10) above represents one example of assessment for a given dynamic performance variable. In other aspects, other ways of measuring assessment can be used such as measuring the number of occurrences that fall outside the baseline upper and lower limits USL and LSL. FIG. 10 illustrates one example of a health assessment calculation for a given dynamic performance variable in terms of its statistics. In the example shown in FIG. 10, 20% of the batch data samples lie outside the baseline range and the in situ (another) value $C_{pkOther}$ is penalized.

Figure 12:
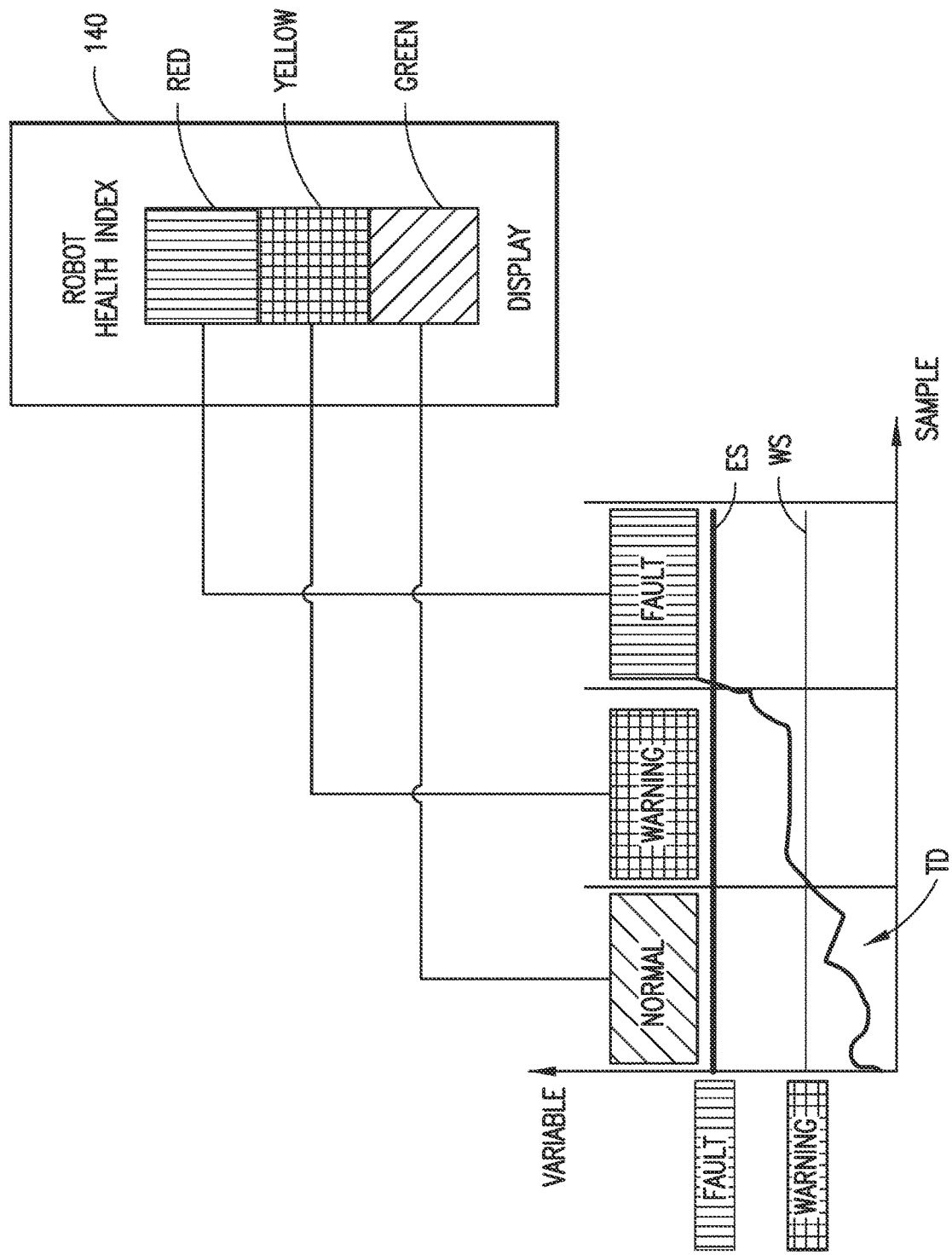
FIG. 12 is an exemplary illustration of a health assessment indication in accordance with aspects of the disclosed embodiment.
Figure 13:
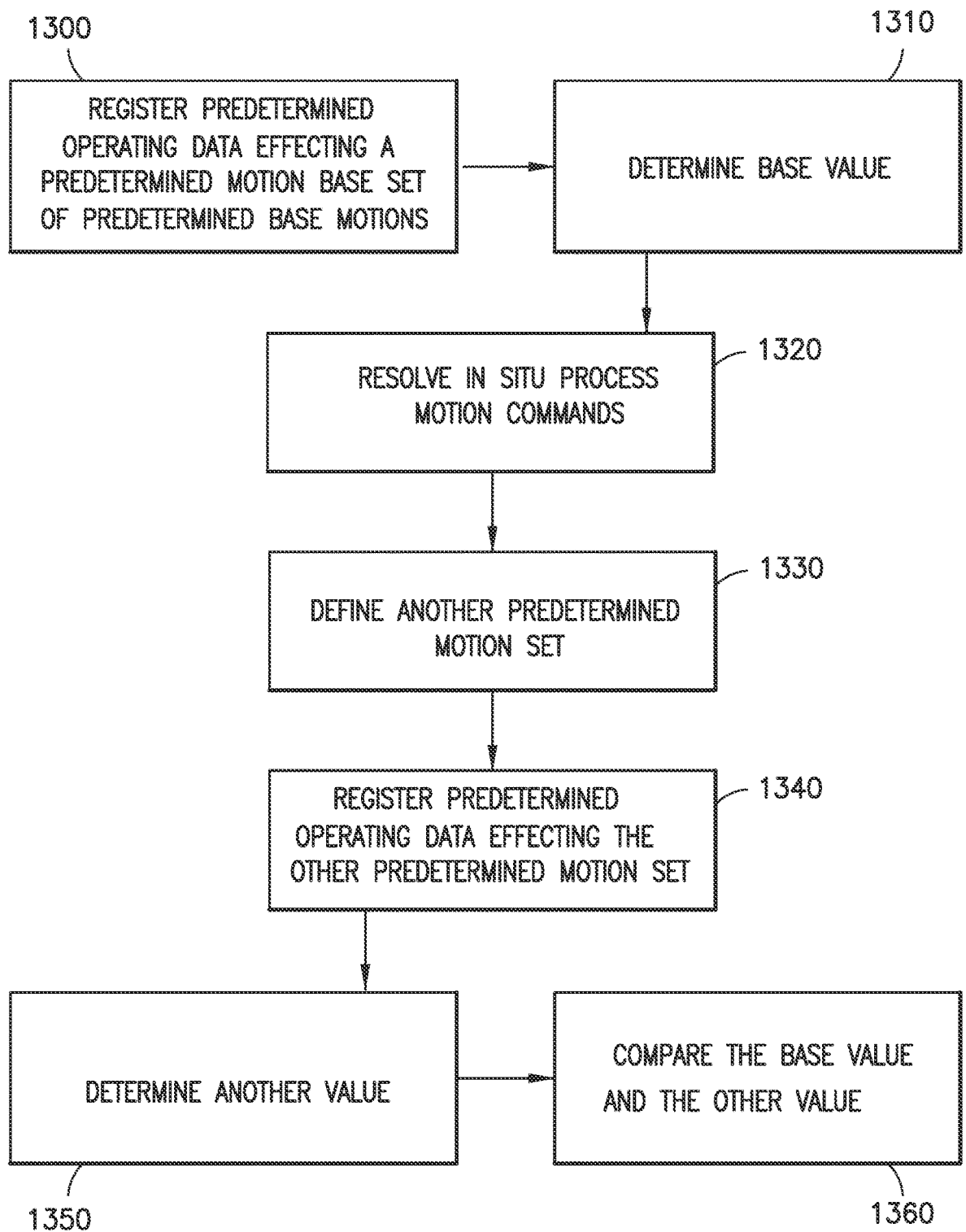
FIG. 13 is an exemplary flow diagram in accordance with aspects of the disclosed embodiment.

Still referring to FIG. 10 as well as FIGS. 11 and 12, the health assessment of each dynamic performance variable of a respective robotic manipulator 306, 311, 400 can be defined in terms of the degree in which the in situ (another) value $C_{pkOther}$ deviates from the base value $C_{pkBase}$. The degree of variation can be defined in terms of prescribed thresholds such as "warning" and "error" where a "warning" may refer to "Attention is Required" and an "error" may refer to "Immediate Action being Required" as will be described below. Another aspect of tracking the in situ (another) value $C_{pkOther}$ (and the base value $C_{pkBase}$) is that this tracking provides for trending analysis, i.e. one can estimate or extrapolate when the corresponding dynamic performance variable is expected to reach the different levels of the degree of variation.

Determining the amount each dynamic performance variable deviates or drifts from its baseline provides for trending data TD for each dynamic performance variable where the trending data TD characterizes a deterioration trend of a respective dynamic performance variable. The trending data TD may be registered in any suitable register TDR of the automated material handing platform 300. FIG. 11 illustrates an exemplary trending data chart of an exemplary dynamic performance variable; where each assessment A1-An from the comparison of the in situ (another) value $C_{pkOther}$ and the base value $C_{pkBase}$ for predetermined points in time from different batch samples are plotted on the chart.

The sloped lines in FIG. 11 represents linear trending models LTM, LTM1-LTMn which can be obtained in any suitable manner such as by using a Least Squares Method; while in other aspects, any suitable trending model can be used. Trending data characterizing a performance deterioration trend of, for example, the robotic manipulator 306 (or any other suitable apparatus of the automated material handling platform 300 (see FIG. 2) and each of the number different unique apparatus App1-Appn (see FIG. 2A) of the automated material handling platform 300 are registered in a registry of, for example, any suitable controller/processor (such as, e.g., a controller of the respective apparatus or the tool controller 314 or processor 810P) of the automated material handling platform 300. In one aspect, the processor 810P combines the performance deterioration trends corresponding to the transport apparatus, such as transport apparatus 306, and each of the number of different unique apparatus App1-Appn of the automated material handling platform 300 to determine a system performance deterioration trend characterizing performance deterioration of the automated material handling platform 300.

Referring to the linear trending model LTM, this linear trending model LTM (which may represent a unique apparatus, such as one of the robotic manipulator 306, the robotic manipulator 311, the aligner 304, a power supply PS of the automated material handling platform 300, etc.) can be used to predict the time $t_{warn}$ as the estimated time (or cycle) for the assessment measure to reach a prescribed warning threshold. Likewise, the time $t_{error}$ can be estimated as the time (or cycle) to reach a point of where the robotic manipulator 306, 311, 400 operation is not recommended to continue. As can be seen in FIG. 11, a linear trending model LTM1-LTMn is determined for each different unique apparatus App1-Appn. The linear trending models LTM1-LTMn may indicate an overall health of the system (such as automated material handling platform 300) as well as the health of each of the different unique apparatus App1-Appn. Also referring to FIG. 2, for example, linear trending model LTM1 may correspond to the power supply PS, linear trending model LTM2 may correspond to the robotic manipulator 306, linear trending model LTM3 may correspond to the robotic manipulator 311 and linear trending model LTMn may correspond to the aligner 307.

As can be seen in FIGS. 11 and 12 the trending data TD may also provide for health assessment warning to be provided to, for example, an operator of the robotic manipulator 306, 311, 400 through for example, any suitable display 140. For example, any suitable controller of the automated material handling platform 300, such as processor 810P which may be separate from or included in the controller 319, 323, 422, 423A, 423B, 423C, 810, may include a trending/assessment unit 870 (FIG. 8A) that is configured to send predetermined signals to indicate to the operator the health assessment of the robotic manipulator 306, 311, 400. In other aspects, the trending/assessment unit 870 may be part of the controller 319, 323, 422, 423A, 423B, 423C, 810. For example, the processor 810P may send, or cause to be visually displayed in for example a yellow color, the "warning" indication when the trending data TD reaches a first predetermined assessment value WS, the "error" indication may be presented in a red color when the trending data TD reaches a second predetermined assessment value ES (e.g. that is lower than the first predetermined assessment value WS), and a "normal" indication (e.g. all dynamic performance variable are within predetermined operation limits) may be presented in a green color when the trending data is above the first predetermined assessment value WS. In other aspects, the operation status of the automated system (e.g. normal, warning and error) may be presented aurally, visually or in any other suitable manner.

In one aspect, the processor 810P aggregates dynamic performance variables, of the at least one dynamic performance variable output by the transport apparatus, with a highest of the deterioration trends (e.g. the lowest percent assessment) and predicts an occurrence of the transport apparatus having a performance below predetermined performance state. For example, the overall health of the robotic manipulator 306, 311, 400 can be measured as the worst case assessment across all dynamic performance variables monitored in a given batch of data samples. For instance, if five dynamic performance variables Var1-Var5 (such as, e.g., T1 position actual, Z acceleration actual, bus motor voltage, T2 temperature and theta command position to illustrate dissimilar variables being compared) are measured and compared against their respective baseline where the resulting assessment values are:

TABLE 9

| Assessment Values | |
|---|---|
| Variable | Assessment |
| Var1 | 95% |
| Var2 | 92% |
| Var3 | 89% |
| Var4 | 96% |
| Var5 | 70% |

In the example above, assessment for dynamic performance variable Var5 is the lowest assessment of the five dynamic performance variables Var1-Var5 and can be used to represent the overall current health assessment of the robotic manipulator 306, 311, 400 whose health is monitored by all of the five dynamic performance variables Var1-Var5. This can be done independently from the physical nature and meaning of each of these dynamic performance variables Var1-Var5 because the assessment can be directly compared across all these entities based on the fact that the assessments are relative measures against their respective baselines.

As an example of the comparison of performance variables described above, the processor 810P compares the performance deterioration trend of the transport apparatus 306 with the performance deterioration trend of each of the number of different unique apparatus App1-Appn, and determines whether the performance deterioration trend of the transport apparatus 306 or the performance deterioration trend of another of the number of different unique apparatus App1-Appn is a controlling performance deterioration trend and whether a controlling performance deterioration trend is determinative of performance deterioration trend of the system. For example, at time $t_s$ the linear trending model LTM2 for the robotic manipulator 306 has the lowest assessment where this lowest assessment is considered the overall health of the automated material handling platform 300 as described with respect to Table 9. As time progresses other linear trending models, such as linear trending model LTM1, may show a more rapid performance deterioration rate. In this instance, for example, the overall health of the automated material handling platform may be judged based on the linear trending model LTM1 at, e.g., time $t_0$, where a warning is generated based on linear trending model LTM1 at time $t_{warnLTM1}$ and an error is generated based on linear trending model LTM1 at time $t_{errorLTM1}$.

While the overall health of the automated material handling system may be determined by a linear trending model having the lowest assessment value for any given time, the linear trending models also provide a fingerprint or indication as to which apparatus App1-Appn is the cause or major contributor to the system error or warning. For example, the power supply PS may affect the other apparatus App1-Appn such as by not supplying enough voltage to, for example, robotic manipulator 306 (corresponding to linear trending model LTM2). As can be seen in FIG. 11, a warning may be generated at time $t_{warnLTM1}$ as a result of the power supply PS performance deterioration. A warning may be generated at time $t_{warnLTM2}$ for the deterioration in performance of the robotic manipulator 306; however, the robotic manipulator 306 may be functioning properly but for the inadequate voltage being supplied to the robotic manipulator 306 by the power supply PS. These two warnings are an indicator that the power supply PS and the robotic manipulator 306 should be checked for repair and suggests that there may be some correlation between the deterioration in performance of the power supply PS and the deterioration in performance of the robotic manipulator 306.

In another aspect, referring to FIGS. 5A and 8A, the aspects of the disclosed embodiment may provide the health of the system as a combined aggregate characterization and health prediction. It is noted that the combined aggregate characterization and health prediction of the system is different than combining/aggregating the different deterioration trends of the components of the system to determine an overall system deterioration trend. For example, the combined aggregate characterization and health prediction may be considered akin to determining a deterioration trend of a system having p number of devices, where the system and its multiple devices are treated as a single unique apparatus, while also determining deterioration trends for each unique device of the system individually as described above. In this aspect, the base moves 501-503 and the in situ process motions 501'-503' are uniquely correlated with a respective unique apparatus as described above. The base moves 501-503 and the in situ process motions 501'-503' may be different for each different apparatus of a common type (e.g. the base moves 501-503 and in situ process motions 501'-503' of robotic manipulator 306 may be different than the base moves 501-503 and in situ process motions 501'-503' of robotic manipulator 311). The base motion set 820, 820A-820C and the other predetermined motion set 830, 830A-830C for the unique system (such as the automated material handling platform 300) may be determined by a base motion set 890 (see FIG. 8A), where the base motions of the base motion set 890 are determined by combining a number of one or more base motions 501-503 where each of the number of one or more base motions is uniquely correlated to a unique device (such as those described in Table 1 and Table 2 above) that is communicably connected (e.g. power supply, robotic manipulator, wafer sensors, etc.) to form a single aggregate motion 890AG. The single aggregate motion is uniquely correlated to a unique system (such as the automated material handling platform 300) and µ number of related combined associated dynamic performance variables (of each device operating in the single aggregate motion) (e.g. $S_{0,\mu}$, $S_{\mu+1}|_{\mu_{devices}}^{i_{moves}}$), is a scalar value and $S_{\mu+1}$ is a vector value, so as to generate system performance normalized values $C_{pkbase(system\ \mu\ devices)}$ and for the mapped motions another value $C_{pkOther(system\ \mu\ devices)}$ uniquely related to the system of µ number of device(s).

Figure 14:
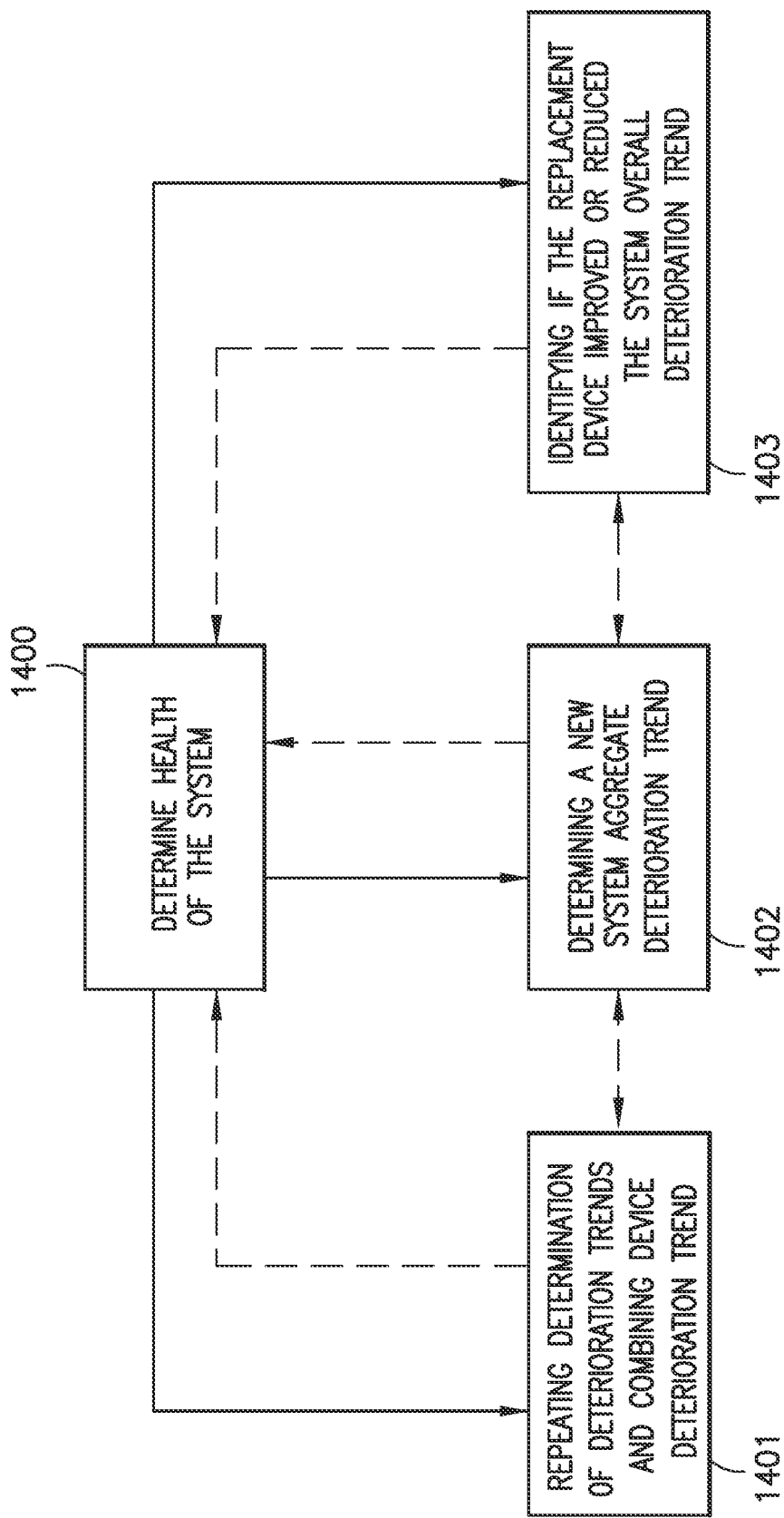
FIG. 14 is a flow diagram in accordance with aspects of the disclosed embodiment.

In one aspect, referring to FIG. 14, where a device (such as those listed in Tables 1 and 2) is replaced in the system (such as the automated material handling platform 300) a health determination of the system may be generated (FIG. 14, Block 1400) by repeating the system health determination, where repeating the system health determination includes (1) repeating the determination of the deterioration trends (as indicated by the linear trending models LTM, LTM1-LTMn) of each device of the system (or at least for the replaced device) and combining the device deterioration trends to determine the overall system health from a controlling one of the deterioration trends as described with respect to, e.g., table 9 (FIG. 14, Block 1401); (2) determining a new system aggregate deterioration trend of the combined aggregate characterization as described above (FIG. 14, Block 1402); (3) identifying if the replacement device improved or reduced the system overall deterioration trend and if the new device reduced the deterioration trend, replace the device again, and/or mixing and matching devices to improve the overall system deterioration trend (FIG. 14, Block 1403).

Figure 15:
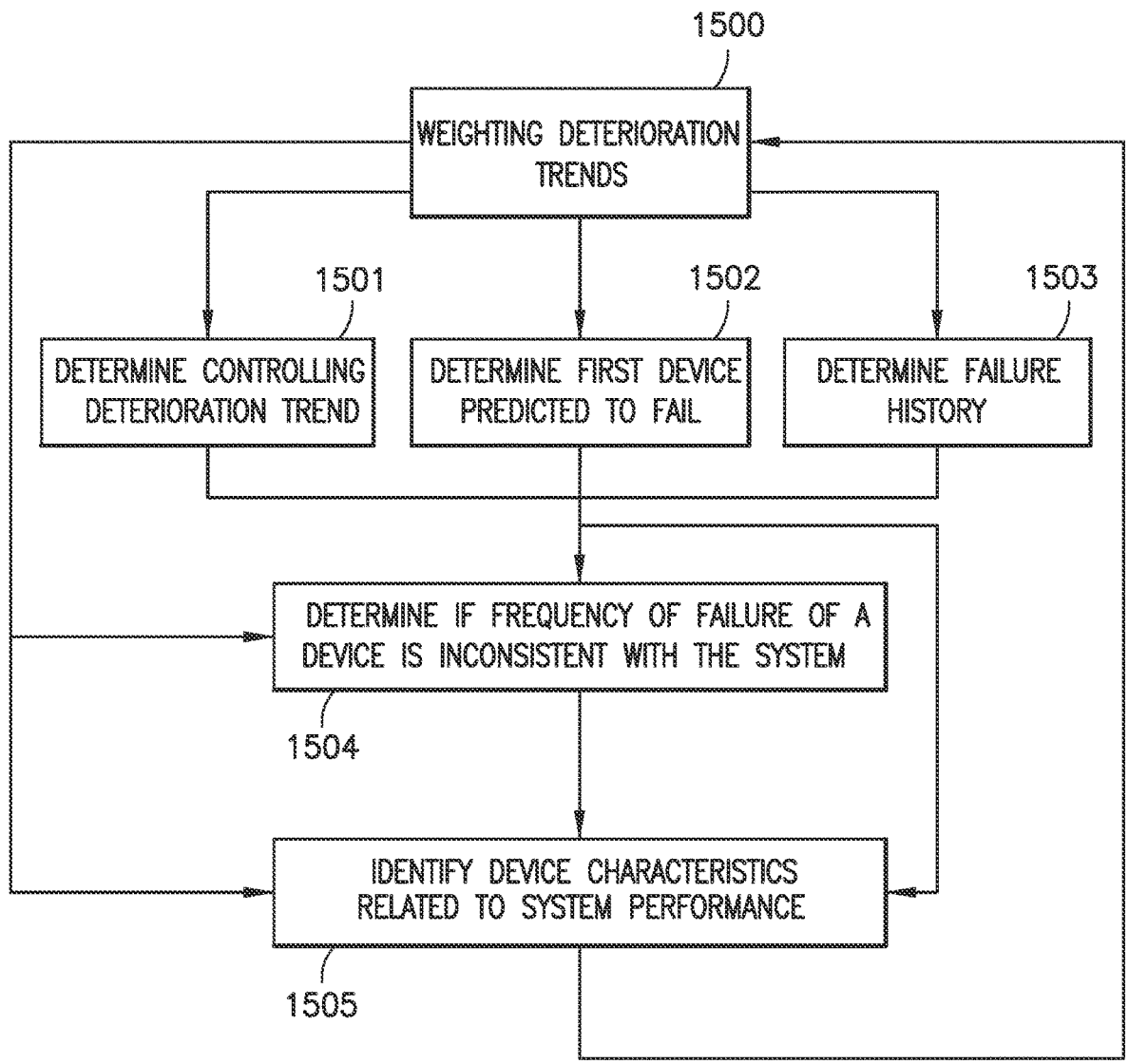
FIG. 15 is a flow diagram in accordance with aspects of the disclosed embodiment.

In one aspect weighting of the deterioration trends (FIG. 15, Block 1500) may be applied by any suitable processor of the system (such as the tool controller 314) to the linear trending models LTM, LTM1-LTMn of each device of the system. For example, when applying the weighting the tool controller 314 may determine if the deterioration trend of any one or more devices is controlling (e.g. the greatest deterioration) or otherwise shows a predicted time of failure outside a predetermined time range of a desired time to failure (FIG. 15, Block 1501); or any one of more devices may otherwise be identified to be the first device predicted to fail and a range (e.g. time range) may be determined between the first device predicted to fail and the last device predicted to fail (FIG. 15, Block 1502). A history (if any) of past failures may also be determined and stored in a memory of the system and reviewed by the tool controller 314 to determine which devices (if any) are prone to being the first to fail (FIG. 15, Block 1503). From the determinations made above, it can be determined by the tool controller 314 if a frequency of failure of a device is inconsistent with the system (e.g. frequencies of failure of other devices) (FIG. 15, Block 1504). The tool controller 314 can also identify device characteristics related to system performance (e.g., whether the system is operable or inoperable with the failed device) (FIG. 15, Block 1505). In one aspect, the device characteristics relative to system performance may be categorized as critical (such as when the system cannot function without the device) or routine (the system can function without the device). The device characteristics may include, but are not limited to the primacy of the device, the difficulty in finding a replacement for the device, accessibility of the device within the system (whether the device is easily accessible for replacement/difficult to access and difficult to replace), the packaging of the device (e.g. a failed motor in a robotic manipulator would require replacement of the robotic manipulator while a failed power supply would require replacing only the power supply) or other factors that may affect system downtime and/or replacement device availability.

The weight given to the deterioration trend for each device may be determined by, for example, the tool controller 314 based on the frequency of failure of the device and the device characteristics related to system performance. The weighting to the device deterioration trends enhances or discounts the affect the device deterioration trend has on the deterioration trend of the system overall where the overall system health assessment is based on the weighted deterioration trends of each of the devices of the system.

As a non-limiting example, linear trending models corresponding to a device that has recently been replaced/repaired may have a lesser weight than a device that has been in service for some time so that the recently replaced/repaired device has a lesser affect on the overall system health determination than the device that has been in service for a longer period of time. In another aspect, the linear trending models LTM, LTM1-LTMn may be weighted so that the linear trending models for devices that are known to fail frequently do not contribute, or contribute to a limited extent, to the health determination of the overall system. In other aspects, the health assessment of the system may not include any weighting factors applied to the linear trending models LTM, LTM1-LTMn.

Referring now to FIGS. 2, 3, 5A, 8A, 8B and 13 an exemplary health assessment operation will be described in accordance with the aspects of the disclosed embodiment. Predetermined operating data are registered (FIG. 13, Block 1300) with a registration system 801R communicably coupled to an apparatus controller 319, 323, 422, 423A-423C, 810. The predetermined operating data embody at least one dynamic performance variable output by the transport apparatus effecting a predetermined motion base set 820, 820A, 820B, 820C of predetermined base motions. A base value $C_{pkBase}$ is determined (FIG. 13, Block 1310) with, for example, the processor 810P, communicably coupled to the registration system 801R. The base value $C_{pkBase}$ is characterized by a probability density function PDF of each of the dynamic performance variable output by the transport apparatus 306, 311, 400 for each motion of the predetermined motion base set 820, 820A, 820B, 820C.

Commands for the in situ process motions 501'-503' are resolved (FIG. 13, Block 1320) by, for example, motion resolver 800 communicably coupled to the apparatus controller 319, 323, 422, 423A-423C, 810. The in situ process motions 501'-503' corresponding to the resolved in situ process motion commands and effected by the transport apparatus 306, 311, 400 map to the predetermined base motions 501-503 of the predetermined motion base set 820, 820A, 820B, 820C. Another predetermined motion set 830, 830A, 830B, 830C of the transport apparatus is defined (FIG. 13, Block 1330) with the mapped in situ process motions 501'-503'.

Predetermined operating data embodying the at least one dynamic performance variable output by the transport apparatus effecting the other predetermined motion set are registered (FIG. 13, Block 1340) by, for example the registration system 801R. The processor 810P determines another value $C_{pkOther}$ (FIG. 13, Block 1350) that is characterized by the probability density function PDF of each of the dynamic performance variable output by the transport apparatus effecting the mapped in situ process motions 501'-503' of the other predetermined motion set 830, 830A-830C.

The other value $C_{pkOther}$ and the base value $C_{pkBase}$ are compared (FIG. 13, Block 1360) by, for example, the processor 810P for each of the dynamic performance variable output by the transport apparatus respectively corresponding to the predetermined motion base set and the other predetermined motion set, wherein the transport apparatus is a common transport apparatus for both the predetermined motion base set and the other predetermined motion set. The health of the transport apparatus is assessed based on the comparison as described above and any suitable health assessment notification can be sent to an operator of the automated material handling platform 300 as described above.

In accordance with one or more aspects of the disclosed embodiment a method for health assessment of a system including a transport apparatus:

registering, with a registration system communicably coupled to an apparatus controller, predetermined operating data embodying at least one dynamic performance variable output by the transport apparatus effecting a predetermined motion base set of predetermined base motions;

determining with a processor, communicably coupled to the registration system, a base value ($C_{pkBase}$) characterized by a probability density function of each of the dynamic performance variable output by the transport apparatus for each motion of the predetermined motion base set;

with a motion resolver communicably coupled to the apparatus controller, resolving from the transport apparatus in situ process motion commands of the apparatus controller, where in situ process motions effected by the transport apparatus map to the predetermined base motions of the predetermined motion base set, and defining with the mapped in situ process motions another predetermined motion set of the transport apparatus;

registering, with the registration system, predetermined operating data embodying the at least one dynamic performance variable output by the transport apparatus effecting the other predetermined motion set, and determining with the processor another value ($C_{pkOther}$) characterized by the probability density function of each of the dynamic performance variable output by the transport apparatus effecting the mapped in situ process motions of the other predetermined motion set; and comparing with the processor the other value and the base value ($C_{pkBase}$) for each of the dynamic performance variable output by the transport apparatus respectively corresponding to the predetermined motion base set and the other predetermined motion set, wherein the transport apparatus is a unique transport apparatus common for both the predetermined motion base set and the other predetermined motion set, and assessing the health of the transport apparatus based on the comparison.

In accordance with one or more aspects of the disclosed embodiment each of the predetermined base motions defines a template motion and each in situ process motion substantially maps onto a corresponding one of the template motions.

In accordance with one or more aspects of the disclosed embodiment each template motion is characterized by at least one of a torque command and a position command from the apparatus controller.

In accordance with one or more aspects of the disclosed embodiment the at least one of the torque command and the position command characterize template motion in at least one degree of freedom of motion of the transport apparatus.

In accordance with one or more aspects of the disclosed embodiment the method further comprises registering, in a registry of the apparatus controller, a histogram of motions commanded by the apparatus controller including in situ process motions effected by the transport apparatus, and wherein the processor resolves the mapped motions from periodic access of the motion histogram in the registry.

In accordance with one or more aspects of the disclosed embodiment the predetermined base motions of the predetermined motion base set include a statistically characterizing number of at least one common base motion defining a base motion type.

In accordance with one or more aspects of the disclosed embodiment the predetermined base motions, of the predetermined motion base set, include a number of different base motion types, each of which is effected by the transport apparatus in a statistically characterizing number of common motions for each base motion type.

In accordance with one or more aspects of the disclosed embodiment each of the different base motion types has a different corresponding at least one torque command characteristic and position command characteristic defining a different common motion respective to each base motion type.

In accordance with one or more aspects of the disclosed embodiment the method further comprises registering, with the registration system, trending data for each of the dynamic performance variable where the trending data characterizes a deterioration trend of a respective dynamic performance variable.

In accordance with one or more aspects of the disclosed embodiment the method further comprises aggregating, with the processor, dynamic performance variables, of the at least one dynamic performance variable output by the transport apparatus, with a highest of the deterioration trends and predicting an occurrence of the transport apparatus having a performance below predetermined performance state.

In accordance with one or more aspects of the disclosed embodiment the method further comprises providing to an operator of the transport apparatus, with the processor, an indication of a prediction of the occurrence of the transport apparatus having a performance below predetermined performance state based on the aggregation of the dynamic performance variables.

In accordance with one or more aspects of the disclosed embodiment a method for health assessment of a system including a transport apparatus is provided. The method comprises:
- registering, with a registration system communicably coupled to an apparatus controller, predetermined operating data embodying at least one dynamic performance variable output by the transport apparatus effecting a predetermined motion base set disposed so as to define a statistical characterization of predetermined base motions;
- determining with a processor, communicably coupled to the registration system, a normalized value statistically characterizing nominal performance of each of the dynamic performance variable output by the transport apparatus for each motion of the predetermined motion base set;
- with a motion resolver communicably coupled to the apparatus controller, resolving from the transport apparatus in situ process motion commands of the apparatus controller, where in situ process motions effected by the transport apparatus map to the predetermined base motions of the predetermined motion base set, and defining with the mapped in situ process motions another predetermined motion set of the transport apparatus;
- registering, with the registration system, predetermined operating data embodying the at least one dynamic performance variable output by the transport apparatus effecting the other predetermined motion set, and determining with the processor another normalized value statistically characterizing in situ process performance of each of the dynamic performance variable output by the transport apparatus effecting the mapped in situ process motion of the other predetermined motion set; and
- comparing with the processor the other normalized value and the normalized value for each of the dynamic performance variable of the transport apparatus respectively corresponding to the predetermined base motion set and the other predetermined motion set, and determining a performance deterioration rate of the transport apparatus from nominal performance based on the comparison, wherein the apparatus is unique and each normalized value ($C_{pkBase}$) for each predetermined base motion of the predetermined motion base set and each other value ($C_{pkOther}$) for each mapped in situ process motion of the other predetermined motion set are uniquely correlated with but the unique apparatus, and the determined performance deterioration rate correlates uniquely with but the unique apparatus.

In accordance with one or more aspects of the disclosed embodiment the method further comprises providing the system with a number of different unique apparatus connected to each other and the transport apparatus, wherein each different unique apparatus from a number of different unique apparatus(i) has different corresponding normalized values ($C_{pkBasei}$) for each base motion of the predetermined base motion set and other normalized values ($C_{pkOtheri}$) for each mapped in situ process motion of the other predetermined motion set that uniquely correlate to no more than that different corresponding unique apparatus(i) from the number of different unique apparatus.

In accordance with one or more aspects of the disclosed embodiment the method further comprises registering, for each different unique apparatus(i), the corresponding normalized values ($C_{pkBasei}$) and other normalized values ($C_{pkOtheri}$) uniquely correlated to that different corresponding unique apparatus(i) with the controller respectively coupled to that different corresponding unique apparatus, and determining for each different unique apparatus(i), on an apparatus by apparatus (i=1 . . . n) basis, the corresponding performance deterioration rate for that different unique apparatus(i) from comparison of the uniquely correlated normalized values ($C_{pkBasei}$) and other normalized values ($C_{pkOtheri}$) of that different unique apparatus(i).

In accordance with one or more aspects of the disclosed embodiment each different unique apparatus from the number of different unique apparatus is of common configuration with the transport apparatus.

In accordance with one or more aspects of the disclosed embodiment each different unique apparatus from the number of different unique apparatus is of different configuration from the transport apparatus.

In accordance with one or more aspects of the disclosed embodiment the method further comprises registering, in a registry of the controller trending data characterizing performance deterioration trend of the transport apparatus and each of the number different unique apparatus of the system.

In accordance with one or more aspects of the disclosed embodiment the method further comprises combining with the processor the performance deterioration trends corresponding to the transport apparatus and each of the number of different unique apparatus of the system to determine a system performance deterioration trend characterizing performance deterioration of the system.

In accordance with one or more aspects of the disclosed embodiment the method further comprises comparing with the processor the performance deterioration trend of the transport apparatus with the performance deterioration trend of each of the number of different unique apparatus, and determining with the processor whether the performance deterioration trend of the transport apparatus or the performance deterioration trend of another of the number of different unique apparatus is a controlling performance deterioration trend and whether a controlling performance deterioration trend is determinative of performance deterioration trend of the system.

In accordance with one or more aspects of the disclosed embodiment each of the predetermined base motions defines a template motion and each in situ process motion substantially maps onto a corresponding one of the template motions.

In accordance with one or more aspects of the disclosed embodiment each template motion is characterized by at least one of a torque command and a position command from the apparatus controller.

In accordance with one or more aspects of the disclosed embodiment the at least one of the torque command and the position command characterize template motion in at least one degree of freedom of motion of the transport apparatus.

In accordance with one or more aspects of the disclosed embodiment the method further comprises registering, in a registry of the apparatus controller, a histogram of motions commanded by the apparatus controller including in situ process motions effected by the transport apparatus, and wherein the processor resolves the mapped motions from periodic access of the motion histogram in the registry.

In accordance with one or more aspects of the disclosed embodiment the predetermined base motions of the predetermined motion base set include a statistically characterizing number of at least one common base motion defining a base motion type.

In accordance with one or more aspects of the disclosed embodiment the predetermined base motions, of the predetermined motion base set, include a number of different base motion types, each of which is effected by the transport apparatus in a statistically characterizing number of common motions for each In accordance with one or more aspects of the disclosed embodiment each of the different base motion types has a different corresponding at least one torque command characteristic and position command characteristic defining a different common motion respective to each base motion type.

In accordance with one or more aspects of the disclosed embodiment the method further comprises registering, with the registration system, trending data for each of the dynamic performance variable where the trending data characterizes a deterioration trend of a respective dynamic performance variable.

In accordance with one or more aspects of the disclosed embodiment the method further comprises aggregating, with the processor, dynamic performance variables, of the at least one dynamic performance variable output by the transport apparatus, with a highest of the deterioration trends and predicting an occurrence of the transport apparatus having a performance below predetermined performance state.

In accordance with one or more aspects of the disclosed embodiment the method further comprises providing to an operator of the transport apparatus, with the processor, an indication of a prediction of the occurrence of the transport apparatus having a performance below predetermined performance state based on the aggregation of the dynamic performance variables.

In accordance with one or more aspects of the disclosed embodiment an health assessing apparatus for assessing a health of a system including a transport apparatus, the health assessing apparatus comprising:
 a registration system communicably coupled to a transport apparatus controller of the transport apparatus, the registration system being configured to
 register predetermined operating data embodying at least one dynamic performance variable output by the transport apparatus effecting a predetermined motion base set of predetermined base motions, and
 register predetermined operating data embodying at least one dynamic performance variable output by the transport apparatus effecting another predetermined motion set; and
 a motion resolver communicably coupled to the transport apparatus controller, the motion resolver being configured to
 resolve from the transport apparatus in situ process motion commands of the apparatus controller, where in situ process motions effected by the transport apparatus map to the predetermined base motions of the predetermined motion base set, and
 define with the mapped in situ process motions the other predetermined motion set of the transport apparatus; and
 a processor communicably coupled to the registration system, the processor being configured to
 determine a base value ($C_{pkBase}$) characterized by a probability density function of each of the dynamic performance variable output by the transport apparatus for each motion of the predetermined motion base set, and
 determine another value ($C_{pkOther}$) characterized by the probability density function of each of the dynamic performance variable output by the transport apparatus effecting the mapped in situ process motions of the other predetermined motion set,
 compare the other value and the base value ($C_{pkBase}$) for each of the dynamic performance variable output by the transport apparatus respectively corresponding to the predetermined motion base set and the other predetermined motion set, and
 assess the health of the transport apparatus based on the comparison;
 wherein the transport apparatus is a common transport apparatus for both the predetermined motion base set and the other predetermined motion set.

In accordance with one or more aspects of the disclosed embodiment each of the predetermined base motions defines a template motion and each in situ process motion substantially maps onto a corresponding one of the template motions.

In accordance with one or more aspects of the disclosed embodiment each template motion is characterized by at least one of a torque command and a position command from the apparatus controller.

In accordance with one or more aspects of the disclosed embodiment the at least one of the torque command and the position command characterize template motion in at least one degree of freedom of motion of the transport apparatus.

In accordance with one or more aspects of the disclosed embodiment the transport apparatus controller comprises a registry the registry being configured to register a histogram of motions commanded by the apparatus controller including in situ process motions effected by the transport apparatus, and the processor is further configured to resolve the mapped motions from periodic access of the motion histogram in the registry.

In accordance with one or more aspects of the disclosed embodiment the predetermined base motions of the predetermined motion base set include a statistically characterizing number of at least one common base motion defining a base motion type.

In accordance with one or more aspects of the disclosed embodiment the predetermined base motions, of the predetermined motion base set, include a number of different base motion types, each of which is effected by the transport apparatus in a statistically characterizing number of common motions for each base motion type.

In accordance with one or more aspects of the disclosed embodiment each of the different base motion types has a different corresponding at least one torque command characteristic and position command characteristic defining a different common motion respective to each base motion type.

In accordance with one or more aspects of the disclosed embodiment the registration system is further configured to register trending data for each of the dynamic performance variable where the trending data characterizes a deterioration trend of a respective dynamic performance variable.

In accordance with one or more aspects of the disclosed embodiment the processor is further configured to aggregate dynamic performance variables, of the at least one dynamic performance variable output by the transport apparatus, with a highest of the deterioration trends and predict an occurrence of the transport apparatus having a performance below predetermined performance state.

In accordance with one or more aspects of the disclosed embodiment the processor is further configured to provide, to an operator of the transport apparatus, an indication of a prediction of the occurrence of the transport apparatus having a performance below predetermined performance state based on the aggregation of the dynamic performance variables.

In accordance with one or more aspects of the disclosed embodiment a health assessment apparatus for assessing a health of a system including a transport apparatus, the health assessing apparatus comprising:
 a registration system communicably coupled to a transport apparatus controller of the transport apparatus, the registration system being configured to
  register predetermined operating data embodying at least one dynamic performance variable output by the transport apparatus effecting a predetermined motion base set disposed so as to define a statistical characterization of predetermined base motions, and
  register predetermined operating data embodying at least one dynamic performance variable output by the transport apparatus effecting another predetermined motion set;
 a motion resolver communicably coupled to the transport apparatus controller, the motion resolver being configured to
  resolve from the transport apparatus in situ process motion commands of the apparatus controller, where in situ process motions effected by the transport apparatus map to the predetermined base motions of the predetermined motion base set, and
  define with the mapped in situ process motions another predetermined motion set of the transport apparatus; and
 a processor communicably coupled to the registration system, the processor being configured to
  determine a normalized value statistically characterizing nominal performance of each of the dynamic performance variable output by the transport apparatus for each motion of the predetermined motion base set,
  determine another normalized value statistically characterizing in situ process performance of each of the dynamic performance variable output by the transport apparatus effecting the mapped in situ process motion of the other predetermined motion set,
  compare the other normalized value and the normalized value for each of the dynamic performance variable of the transport apparatus respectively corresponding to the predetermined base motion set and the other predetermined motion set, and
  determine a performance deterioration rate of the transport apparatus from nominal performance based on the comparison;
 wherein the transport apparatus is a common transport apparatus for both the predetermined base motion set and the other predetermined motion set.

In accordance with one or more aspects of the disclosed embodiment each of the predetermined base motions defines a template motion and each in situ process motion substantially maps onto a corresponding one of the template motions.

In accordance with one or more aspects of the disclosed embodiment each template motion is characterized by at least one of a torque command and a position command from the apparatus controller.

In accordance with one or more aspects of the disclosed embodiment the at least one of the torque command and the position command characterize template motion in at least one degree of freedom of motion of the transport apparatus.

In accordance with one or more aspects of the disclosed embodiment the transport apparatus controller comprises a registry, the registry being configured to register a histogram of motions commanded by the apparatus controller including in situ process motions effected by the transport apparatus, and the processor is further configured to resolve the mapped motions from periodic access of the motion histogram in the registry.

In accordance with one or more aspects of the disclosed embodiment the predetermined base motions of the predetermined motion base set include a statistically characterizing number of at least one common base motion defining a base motion type.

In accordance with one or more aspects of the disclosed embodiment the predetermined base motions, of the predetermined motion base set, include a number of different base motion types, each of which is effected by the transport apparatus in a statistically characterizing number of common motions for each In accordance with one or more aspects of the disclosed embodiment each of the different base motion types has a different corresponding at least one torque command characteristic and position command characteristic defining a different common motion respective to each base motion type.

In accordance with one or more aspects of the disclosed embodiment the registration system is further configured to register trending data for each of the dynamic performance variable where the trending data characterizes a deterioration trend of a respective dynamic performance variable.

In accordance with one or more aspects of the disclosed embodiment the processor is further configured to aggregate dynamic performance variables, of the at least one dynamic performance variable output by the transport apparatus, with a highest of the deterioration trends and predict an occurrence of the transport apparatus having a performance below predetermined performance state.

In accordance with one or more aspects of the disclosed embodiment the processor is further configured to provide, to an operator of the transport apparatus, an indication of a prediction of the occurrence of the transport apparatus having a performance below predetermined performance state based on the aggregation of the dynamic performance variables.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A method for health assessment of a system including a transport apparatus, the method comprising:
    registering, with a registration system communicably coupled to an apparatus controller, predetermined operating data embodying at least one dynamic performance variable output by at least one apparatus component of the transport apparatus effecting a predetermined pose command base set of predetermined base pose commands of the transport apparatus;
    determining with a processor, communicably coupled to the registration system, a base value characterized by a probability density function of each of the dynamic performance variable output by the at least one apparatus component for each pose command of the predetermined pose command base set;
    with a resolver communicably coupled to the apparatus controller, resolving from the at least one apparatus component in situ process pose commands of the apparatus controller, where in situ process poses effected by the at least one apparatus component map to the predetermined base pose commands of the predetermined pose command base set, and defining with the mapped in situ process poses another predetermined pose command set, of the transport apparatus that corresponds to the transport apparatus of the predetermined pose command base set; and
    registering, with the registration system, predetermined operating data embodying the at least one dynamic performance variable output by the at least one apparatus component effecting the other predetermined pose command set, and determining with the processor another value characterized by the probability density function of each of the dynamic performance variable output by the at least one apparatus component effecting the mapped in situ process poses of the other predetermined pose command set for comparison of the other value with the base value and assessing the health of the transport apparatus based on the comparison.

2. The method of claim 1, further comprising comparing with the processor the other value and the base value for each of the dynamic performance variable output by the at least one apparatus component respectively corresponding to the predetermined pose command base set and the other predetermined pose command set.

3. The method of claim 1, wherein the transport apparatus is a unique transport apparatus common for both the predetermined pose command base set and the other predetermined pose command set.

4. The method of claim 1, wherein each of the predetermined base command defines a template command pose and each in situ process maps onto a corresponding one of the template command.

5. The method of claim 1, further comprising registering, in a registry of the apparatus controller, a histogram of commanded by the apparatus controller including in situ process effected by the at least one apparatus component, and wherein the processor resolves the mapped in situ process from periodic access of the pose histogram in the registry.

6. The method of claim 1, wherein the predetermined base command of the predetermined pose command base set include a statistically characterizing number of at least one common base command defining a base command type.

7. The method of claim 1, wherein the predetermined base command, of the predetermined pose command base set, include a number of different base command types, each of which is effected by the at least one apparatus component in a statistically characterizing number of common command for each base command type.

8. The method of claim 7, wherein each of the different base command types has a different corresponding at least one command characteristic and position command characteristic defining a different common command respective to each base command type.

9. The method of claim 1, further comprising registering, with the registration system, trending data for each of the dynamic performance variable where the trending data characterizes a deterioration trend of a respective dynamic performance variable.

10. The method of claim 9, further comprising aggregating, with the processor, dynamic performance variables, of the at least one dynamic performance variable output by the at least one apparatus component, with a highest of the deterioration trends and predicting an occurrence of the transport apparatus having a performance below predetermined performance state.

11. The method of claim 10, further comprising providing to an operator of the transport apparatus, with the processor, an indication of a prediction of the occurrence of the transport apparatus having a performance below predetermined performance state based on the aggregation of the dynamic performance variables.

12. A health assessing apparatus for assessing a health of a system including a transport apparatus, the health assessing apparatus comprising:
    a registration system communicably coupled to a transport apparatus controller of the transport apparatus, the registration system being configured to:
    register predetermined operating data embodying at least one dynamic performance variable output by at least one apparatus component of the transport apparatus effecting a predetermined pose command base set of predetermined base commands of the transport apparatus, and
    register predetermined operating data embodying at least one dynamic performance variable output by the at least one apparatus component effecting another predetermined pose command set;
    a resolver communicably coupled to the transport apparatus controller, the resolver being configured to:
    resolve from the at least one apparatus component in situ process commands of the apparatus controller, where in situ process effected by the at least one apparatus component map to the predetermined base commands of the predetermined command base set, and
    define with the mapped in situ process the other predetermined pose command set of the transport apparatus that corresponds to the transport apparatus of the predetermined pose command base set; and
    a processor communicably coupled to the registration system, the processor being configured to:
    determine a base value characterized by a probability density function of each of the dynamic performance variable output by the at least one apparatus component for each command of the predetermined pose command base set, and determine another value characterized by the probability density function of each of the dynamic performance variable output by the at least one apparatus component effecting the mapped in situ process of the other predetermined pose command set for comparison of the other value with the base value and assessing the health of the transport apparatus based on the comparison.

13. The apparatus of claim 12, wherein the processor is further configured to compare the other value and the base value for each of the dynamic performance variable output by the at least one apparatus component respectively corresponding to the predetermined pose command base set and the other predetermined pose command set.

14. The apparatus of claim 12, wherein the transport apparatus is a common transport apparatus for both the predetermined pose command base set and the other predetermined pose command set.

15. The apparatus of claim 12, wherein each of the predetermined base command defines a template command and each in situ process maps onto a corresponding one of the template command.

16. The apparatus of claim 12, wherein the transport apparatus controller comprises a registry, the registry being configured to register a histogram of commanded by the apparatus controller including in situ process effected by the at least one apparatus component, and the processor is further configured to resolve the mapped in situ process from periodic access of the histogram in the registry.

17. The apparatus of claim 12, wherein the predetermined base command of the predetermined pose command base set include a statistically characterizing number of at least one common base command defining a base command type.

18. The apparatus of claim 12, wherein the predetermined base command, of the predetermined pose command base set, include a number of different base command types, each of which is effected by the at least one apparatus component in a statistically characterizing number of common command for each base command type.

19. The apparatus of claim 18, wherein each of the different base command types has a different corresponding at least one command characteristic and position command characteristic defining a different common command respective to each base command type.

20. The apparatus of claim 12, wherein the registration system is further configured to register trending data for each of the dynamic performance variable where the trending data characterizes a deterioration trend of a respective dynamic performance variable.

21. The apparatus of claim 20, wherein the processor is further configured to aggregate dynamic performance variables, of the at least one dynamic performance variable output by the at least one apparatus component, with a highest of the deterioration trends and predict an occurrence of the transport apparatus having a performance below predetermined performance state.

22. The apparatus of claim 21, wherein the processor is further configured to provide, to an operator of the transport apparatus, an indication of a prediction of the occurrence of the transport apparatus having a performance below predetermined performance state based on the aggregation of the dynamic performance variables.

* * * * *